United States Patent
Kelfkens et al.

(10) Patent No.: US 9,771,531 B2
(45) Date of Patent: Sep. 26, 2017

(54) BIOMASS TO TRANSPORTATION FUELS USING A FISCHER-TROPSCH PROCESS

(71) Applicant: Sundrop Fuels, Inc., Longmont, CO (US)

(72) Inventors: Renus C. Kelfkens, Longmont, CO (US); Wayne W. Simmons, Longmont, CO (US); Douglas S. Jack, Longmont, CO (US); Jerrod Wayne Hohman, Louisville, CO (US); Sidney P. White, Fort Collins, CO (US)

(*) Notice: Subject to any disclaimer, the term of this patent is extended or adjusted under 35 U.S.C. 154(b) by 0 days.

(21) Appl. No.: 14/952,060

(22) Filed: Nov. 25, 2015

(65) Prior Publication Data
US 2016/0152905 A1 Jun. 2, 2016

Related U.S. Application Data

(60) Provisional application No. 62/084,868, filed on Nov. 26, 2014.

(51) Int. Cl.
*C10G 3/00* (2006.01)
*C10G 2/00* (2006.01)
(Continued)

(52) U.S. Cl.
CPC ........ *C10J 3/466* (2013.01); *C01B 3/38* (2013.01); *C10G 2/32* (2013.01); *C10G 2/34* (2013.01);
(Continued)

(58) Field of Classification Search
CPC ........ C10G 45/00; C10G 45/44; C10G 3/00; C10G 2/34; C10G 2/32; C10G 2300/1011;
(Continued)

(56) References Cited

U.S. PATENT DOCUMENTS 5,496,859 A 3/1996 Fong et al.
6,627,666 B1 9/2003 Pedersen
(Continued)

OTHER PUBLICATIONS

Higuchi, Takayoshi "Steam Explosion of Wood", Sections 1-4, Biomass Handbook, © 1989 by OPA (Amsterdam), pp. 470-473 plus Cover, Biblio, Table of Contents excerpt. 7 pages total, Editors: Osamu Kitani & Carl W. Hall, ISBN 2-88124-269-3, Gordon and Breach Science Publishers S. A., Cooper Station, New York, New York.

(Continued)

*Primary Examiner* — Jafar Parsa

(57) ABSTRACT

An integrated plant to generate chemical grade syngas from a steam biomass reforming in a multiple stage bio reforming reactor for use with either a high temperature or low temperature Fischer-Tropsch synthesis process to produce fuel from biomass is discussed. The first stage has a reactor to cause a chemical devolatilization of a biomass feedstock from the biomass feedstock supply lines into its constituent gases of CO, H2, CO2, CH4, tars, chars, and other components into a raw syngas mixture. A second stage performs further reforming of the raw syngas from the first stage into the chemical grade syngas by further applying heat and pressure to chemically crack at least the tars, reform the CH4, or a combination of both, into their corresponding syngas molecules. The second stage feeds the chemical grade syngas derived from the biomass feedstock to the downstream Fischer-Tropsch train to produce the fuel from the biomass. One or more recycle loops supply tail gas or FT product back into the plant.

18 Claims, 17 Drawing Sheets

(51) Int. Cl.
*C10J 3/46* (2006.01)
*C10G 45/44* (2006.01)
*C10K 1/08* (2006.01)
*C10K 1/32* (2006.01)
*C10K 3/02* (2006.01)
*C10G 45/00* (2006.01)
*C10L 1/04* (2006.01)
*C10K 3/00* (2006.01)
*C10J 3/84* (2006.01)
*C10J 3/50* (2006.01)
*C01B 3/38* (2006.01)
*C10J 3/48* (2006.01)

(52) U.S. Cl.
CPC .............. *C10G 3/00* (2013.01); *C10G 45/00* (2013.01); *C10G 45/44* (2013.01); *C10J 3/485* (2013.01); *C10J 3/506* (2013.01); *C10J 3/84* (2013.01); *C10K 1/08* (2013.01); *C10K 1/32* (2013.01); *C10K 3/008* (2013.01); *C10K 3/023* (2013.01); *C10L 1/04* (2013.01); *C01B 2203/0233* (2013.01); *C01B 2203/062* (2013.01); *C01B 2203/1241* (2013.01); *C10G 2300/1011* (2013.01); *C10G 2400/02* (2013.01); *C10G 2400/04* (2013.01); *C10G 2400/08* (2013.01); *C10J 2300/0916* (2013.01); *C10J 2300/0976* (2013.01); *C10J 2300/1659* (2013.01); *C10J 2300/1807* (2013.01); *C10J 2300/1853* (2013.01); *C10L 2200/0492* (2013.01); *C10L 2270/023* (2013.01); *C10L 2270/026* (2013.01); *C10L 2270/04* (2013.01); *C10L 2290/04* (2013.01); *C10L 2290/06* (2013.01); *C10L 2290/10* (2013.01); *C10L 2290/42* (2013.01); *C10L 2290/541* (2013.01); *C10L 2290/542* (2013.01); *C10L 2290/543* (2013.01); *C10L 2290/548* (2013.01); *Y02E 50/32* (2013.01); *Y02P 20/145* (2015.11); *Y02P 20/582* (2015.11); *Y02P 30/20* (2015.11)

(58) Field of Classification Search
CPC ............ C10G 2400/04; C10G 2400/08; C01B 2203/1241; C01B 2203/062; C01B 2203/0233; B01J 8/818; B01J 8/1827; B01J 8/24; B01J 2208/00769; C10L 2290/548; C10L 2290/42; C10L 2290/10; C10L 2290/06; C10L 2290/04; C10L 2270/04; C10L 2270/023; C10L 2200/0492; C10J 2300/1853; C10J 2300/1807; C10J 2300/1659; C10J 2300/0916

See application file for complete search history.

(56) References Cited

U.S. PATENT DOCUMENTS

| | | |
|---|---|---|
| 6,872,378 B2 | 3/2005 | Weimer et al. |
| 7,033,570 B2 | 4/2006 | Weimer et al. |
| 7,553,476 B2 | 6/2009 | Marrella et al. |
| 7,632,476 B2 | 12/2009 | Shah et al. |
| 7,686,856 B2 | 3/2010 | Hemmings et al. |
| 7,856,829 B2 | 12/2010 | Shah et al. |
| 7,871,457 B2 | 1/2011 | Shah et al. |
| 7,881,825 B2 | 2/2011 | Esposito et al. |
| 7,931,888 B2 | 4/2011 | Drnevich et al. |
| 7,985,399 B2 | 7/2011 | Drnevich et al. |
| 8,007,761 B2 | 8/2011 | Drnevich et al. |
| 2003/0208959 A1 | 11/2003 | Weimer et al. |
| 2006/0140848 A1 | 6/2006 | Weimer et al. |
| 2006/0188433 A1 | 8/2006 | Weimer et al. |
| 2009/0013601 A1 | 1/2009 | Mandich et al. |
| 2009/0151253 A1 | 6/2009 | Manzer et al. |
| 2009/0313886 A1 | 12/2009 | Hinman |
| 2010/0000874 A1 | 1/2010 | Hinman |
| 2010/0137459 A1 | 6/2010 | Stites et al. |
| 2010/0270505 A1 | 10/2010 | Gallaspy et al. |
| 2010/0273899 A1 | 10/2010 | Winter |
| 2011/0107661 A1 | 5/2011 | Tirmizi et al. |
| 2011/0124927 A1 | 5/2011 | Stites et al. |
| 2011/0155958 A1 | 6/2011 | Winter et al. |

OTHER PUBLICATIONS

"StakeTech—First Pulping System Receives Full Acceptance", May 14, 1996, 2 pages. Publisher: Business Wire. downloaded from http://www.thefreelibrary.com/StakeTech.

McCallum, Don, "Medium Density Fiber Board" pp. 8-11, Nov. 1, 1996 http://fennerschool-associated.anu.edu.au/fpt/mdf/manufacture.html.

International Search Report and Written Opinion for International Application No. PCT/US2015/062697 mailed Feb. 4, 2016, 10 pages. International Searching Authority/US, Alexandria VA US.

Figure 1b

| Syngas | | JH-LTFT | | H-HTFT | | SD1 H&MB | | | SMR, Dry syngas |
|---|---|---|---|---|---|---|---|---|---|
| | | bio-reforming reactor syngas only | bio-reforming reactor + steam methane reformer syngas | bio-reforming reactor syngas only | bio-reforming reactor + steam methane reformer syngas | | bio-reforming reactor syngas only | bio-reforming reactor syngas only | |
| | Wt% | Mol% | Mol% | Mol% | Mol% | lb/h | Mol% | Mol% | Mol% |
| H2 | 9.2 | 51.8% | 55.0% | 49.6% | 68.4% | 19612 | 9806.00 | 52.1% | 72.7% |
| CO | 64.4 | 26.8% | 26.6% | 29.0% | 18.5% | 168855 | 6030.54 | 32.0% | 14.4% |
| CO2 | 20.7 | 15.2% | 14.9% | 15.4% | 9.9% | 104728 | 2380.18 | 12.6% | 7.4% |
| CH4 | 1.7 | 2.4% | 2.7% | 4.1% | 2.6% | 7644 | 546.00 | 2.9% | 3.2% |
| Inerts | 2.3 | 0.0% | 0.2% | 0.1% | 0.1% | 133 | 8.31 | 0.0% | 0.4% |
| Water | 1.7 | 3.7% | 0.5% | 1.8% | 0.5% | 1084 | 60.22 | 0.3% | 1.8% |
| | | 99.9% | 99.9% | 100.0% | 100.0% | 302056 | 18831.25 | 100.0% | 100.0% |
| | | | | | | | | | |
| H2:CO | | 1.93 | 2.07 | 1.71 | 3.70 | | 1.63 | 1.63 | 5.05 |
| Ribblett Ratio | | | | | 1.03 | | | | |
| Total non-recatives | | 18.3% | | | | | | | |

Figure 3

Figure 4b — HTFT PSA Unbalanced Fuel BFD

Figure 5b

HTFT PSA Optimized BFD

Figure 6b

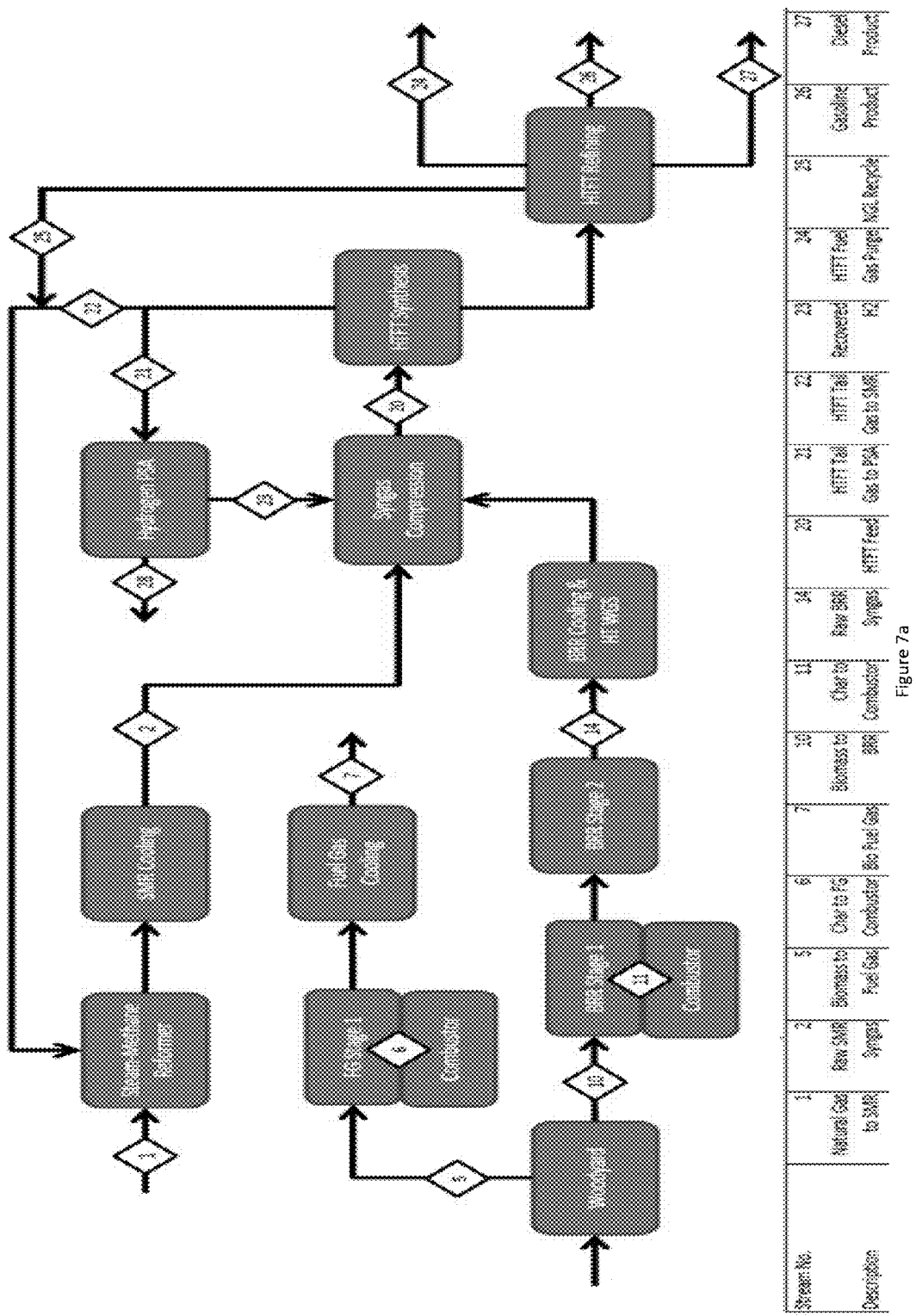

| Stream No. | 1 | 2 | 5 | 6 | 7 | 108 | 111 | 104 | 201 | 211 | 221 | 23 | 241 | 251 | 261 | 271 | 281 |
|---|---|---|---|---|---|---|---|---|---|---|---|---|---|---|---|---|---|
| Description | Natural Gas to SMR | Raw SMR Syngas | Biomass to Fuel Gas | Char to FG Combustor | Bio Fuel Gas | Biomass to BBR | Char to Combustor | Raw BBR Syngas | HTFT Feed | HTFT Tail Gas to PSA | HTFT Tail Gas to SMR | Recovered H2 | HTFT Fuel Gas Purge | NGL Recycle | Gasoline Product | Diesel Product | PSA Tail Gas (Fuel) |
| Temperature | deg F | 440 | 1800 | 70 | 1800 | 440 | 100 | 1800 | 115 | 115 | -72 | -72 | 120 | 120 | 120 | 120 | 120 | 115 |
| Pressure | psia | 450 | 272 | 14.7 | 114 | 104 | 14.7 | 14.7 | 430 | 430 | 400 | 400 | 300 | 250 | 250 | 250 | 250 | 115 |
| Flow | lb/hr | 1,096,862 | 785,668 | 0 | 1,022 | 4,440 | 445,056 | 78,420 | 579,084 | 1,188,246 | 184,507 | 524,565 | 17,845 | 78,873 | 4,561 | 111,559 | 59,408 | 166,460 |
| | lbmol/hr | 61,100 | 68,495 | 0 | 0 | 104 | 19,436 | 1,622 | 34,740 | 103,398 | 14,642 | 43,598 | 8,852 | 6,380 | 109 | 1,062 | 311 | 5,761 |
| | mol/day | 56.3 | 624.0 | | | 0.0 | | | 345.5 | 944.0 | 133.1 | 378.6 | 80.6 | 56.5 | 1.0 | 10.6 | 2.0 | 52.5 |
| Carbon Flow | lb/day | 76,960 | 344,905 | 0 | 0 | 0 | 217,134 | 63,006 | 156,638 | 401,549 | 57,700 | 164,280 | 0 | 24,659 | 3,522 | 98,825 | 30,480 | 57,793 |
| Renewable | % | 0 | 50 | 100 | 100 | 100 | 100 | 100 | 100 | 67 | 67 | 67 | 67 | 67 | 67 | 67 | 67 | 67 |
| Steam:C Ratio | | | 1.77 | | | | | | 0.52 | 1.09 | 1.02 | 1.02 | | | | | | |
| Composition | | | | | | | | | | | | | | | | | | |
| Hydrogen | mol % | 0.0 | 67.1 | | | 22.6 | | | 41.8 | 67.1 | 67.3 | 67.2 | 100.0 | 67.1 | 0.0 | 0.0 | 0.0 | 17.1 |
| CO2 | mol % | 0.0 | 17.3 | | | 27.2 | | | 22.1 | 18.9 | 3.11 | 3.11 | 0.0 | 3.2 | 0.0 | 0.0 | 0.0 | 8.9 |
| Nitrogen | mol % | 1.5 | 7.5 | | | 11.7 | | | 12.2 | 9.1 | 10.9 | 10.9 | 0.0 | 20.0 | 0.0 | 0.0 | 0.0 | 58.4 |
| Methane | mol % | 94.7 | 0.4 | | | 0.3 | | | 0.0 | 0.3 | 0.2 | 0.2 | 0.0 | 0.2 | 0.0 | 0.0 | 0.0 | 0.5 |
| C2 | mol % | 2.3 | 4.50 | | | 12.9 | | | 3.2 | 4.5 | 9.0 | 9.0 | 0.0 | 9.1 | 33.5 | 0.0 | 0.0 | 22.9 |
| C3 | mol % | 0.4 | 0.0 | | | 4.2 | | | 0.0 | 0.0 | 0.4 | 0.4 | 0.0 | 0.4 | 36.2 | 0.0 | 0.0 | 1.1 |
| C4 | mol % | 0.2 | 0.0 | | | 0.3 | | | 0.0 | 0.0 | 0.0 | 0.0 | 0.0 | 0.0 | 6.0 | 0.0 | 0.0 | 0.0 |
| C5-C9 | mol % | 0.3 | 0.0 | | | 0.2 | | | 0.0 | 0.0 | 0.0 | 0.0 | 0.0 | 0.0 | 0.0 | 0.0 | 0.0 | 0.0 |
| Tar | mol % | 0.5 | 2.90 | | | 11.0 | | | 20.7 | 0.6 | 0.0 | 0.0 | 0.0 | 0.0 | 0.0 | 0.0 | 0.0 | 0.0 |
| Water | mol % | 0.0 | 0.0 | | | 0.0 | | | 0.0 | 0.0 | 0.0 | 0.0 | 0.0 | 0.0 | 0.0 | 0.0 | 0.0 | 0.0 |
| Gasoline | mol % | 0.0 | 0.0 | | | 0.0 | | | 0.0 | 0.0 | 0.0 | 0.0 | 0.0 | 0.0 | 0.0 | 100.0 | 0.0 | 0.0 |

Figure 7b

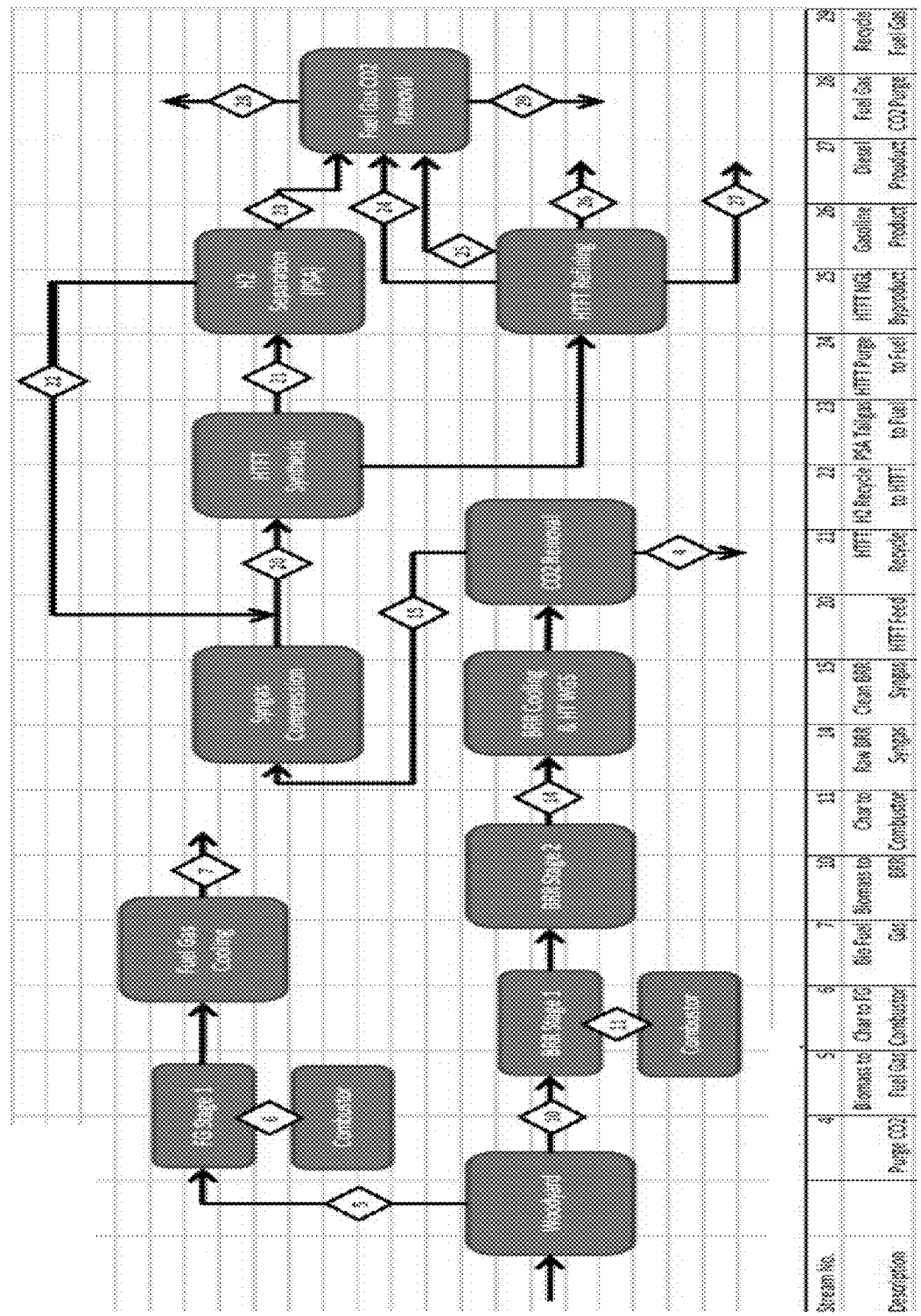

Figure 11b — HTFT PSA max H2 recovery

BIOMASS TO TRANSPORTATION FUELS USING A FISCHER-TROPSCH PROCESS

RELATED APPLICATIONS

The application claims priority under 35 USC 119 to the earlier filed provisional patent application, Ser. No. 62/084,868 filed Nov. 26, 2014 and titled "Biomass to Transportation Fuels Using High Temperature Fischer-Tropsch", which is incorporated herein by reference.

FIELD

The design generally relates to a Biomass to Transportation Fuels using a Fischer-Tropsch process.

BACKGROUND

High Temperature Fischer-Tropsch process is not favored for fuels production as a result of complexity and destruction of its higher value extractable chemicals making up the primary crude product streams. High Temperature Fischer-Tropsch is therefore generally ruled out as a process to produce fuels in favor of using a low temperature Fischer-Tropsch for a GTL type application. Others, such as Rentech, have developed their own low temperature FT process for coal applications. Fuels production from the High Temperature Fischer-Tropsch process has been practiced by Sasol in South Africa for many years based on synthesis gas production coal feedstock. As best known, the potential application of integrating a Fischer-Tropsch process in association with biomass feedstock from a multiple stage bio reforming reactor has not been attempted.

SUMMARY

An integrated plant to generate chemical grade syngas from a steam biomass reforming in a multiple stage bio reforming reactor for use with either a high temperature or low temperature Fischer-Tropsch synthesis process to produce fuel from biomass is discussed. The first stage has a circulating fluidized bed reactor to cause a chemical devolatilization of a biomass feedstock from the biomass feedstock supply lines into its constituent gases of CO, H2, CO2, CH4, tars, chars, and other components into a raw syngas mixture. A second stage performs further reforming of the raw syngas from the first stage into the chemical grade syngas by further applying heat and pressure to chemically crack at least the tars, reform the CH4, or a combination of both, into their corresponding syngas molecules. The second stage feeds the chemical grade syngas derived from the biomass feedstock to the downstream Fischer-Tropsch train to produce the fuel from the biomass.

In an embodiment, the integrated plant includes a steam expansion unit, a bio reforming reactor to generate syngas from biomass from the stream explosion unit, a steam methane reformer in parallel with the bio reforming reactor, and a high temperature Fischer-Tropsch reactor train that uses reaction syngas product derived from the steam biomass reforming in the bio reforming reactor and syngas from the steam methane reformer. The high temperature Fischer-Tropsch (HTFT) reactor couples to the bio reforming reactor as well as the steam methane reforming reactor. Several of the units in the HTFT block provide for recycling various components of the product slate from the HTFT process back to the steam methane reforming reactor and the bio reforming reactor. The product slate from HTFT allows higher production of diesel, a more valuable product than the gasoline or LPGs produced from the Methanol To Gasoline process. Using a HTFT reactor train also leads to a capital cost reduction on that part of the plant.

In an embodiment, the integrated plant has a Low Temperature Fischer-Tropsch train and recycle loops that recycle products back to any of the steam-methane reformer, the bio reforming reactor, or other plant components that use fuel gas as a source of fuel.

BRIEF DESCRIPTION OF THE DRAWINGS

The multiple drawings refer to the example embodiments of the design.

FIG. 1B illustrates a table of example parameters and chemical products of an embodiment of the integrated plant of FIG. 1A.

FIG. 3 illustrates a table of example parameters for the integrated plant using biomass derived syngas compared to standard HTFT and LTFT parameters.

FIG. 4B illustrates a table of example parameters and chemical products of an embodiment of the integrated plant of FIG. 4A.

FIG. 5B illustrates a table of example parameters and chemical products of an embodiment of the integrated plant of FIG. 5A.

FIG. 6B illustrates a table of example parameters and chemical products of an embodiment of the integrated plant of FIG. 6A.

FIG. 7A illustrates a block diagram of an embodiment of the integrated plant with a High Temperature Fischer-Tropsch train, a hydrogen Pressure Swing Absorber separator, and recycle loops that recycle product liquid fuels including natural gas in liquid form (NGL) and oxygenates back to the steam-methane reformer.

FIG. 7B illustrates a table of example parameters and chemical products of an embodiment of the integrated plant of FIG. 7A.

FIG. 8 illustrates a block diagram of an embodiment of the integrated plant with a Fischer-Tropsch train and a feed system supplying wood biomass chips to both the first stage of the bio reforming reactor and the fuel gas production unit.

FIG. 11B illustrates a table of example parameters and chemical products of an embodiment of the integrated plant of FIG. 11A.

Figure 1A:
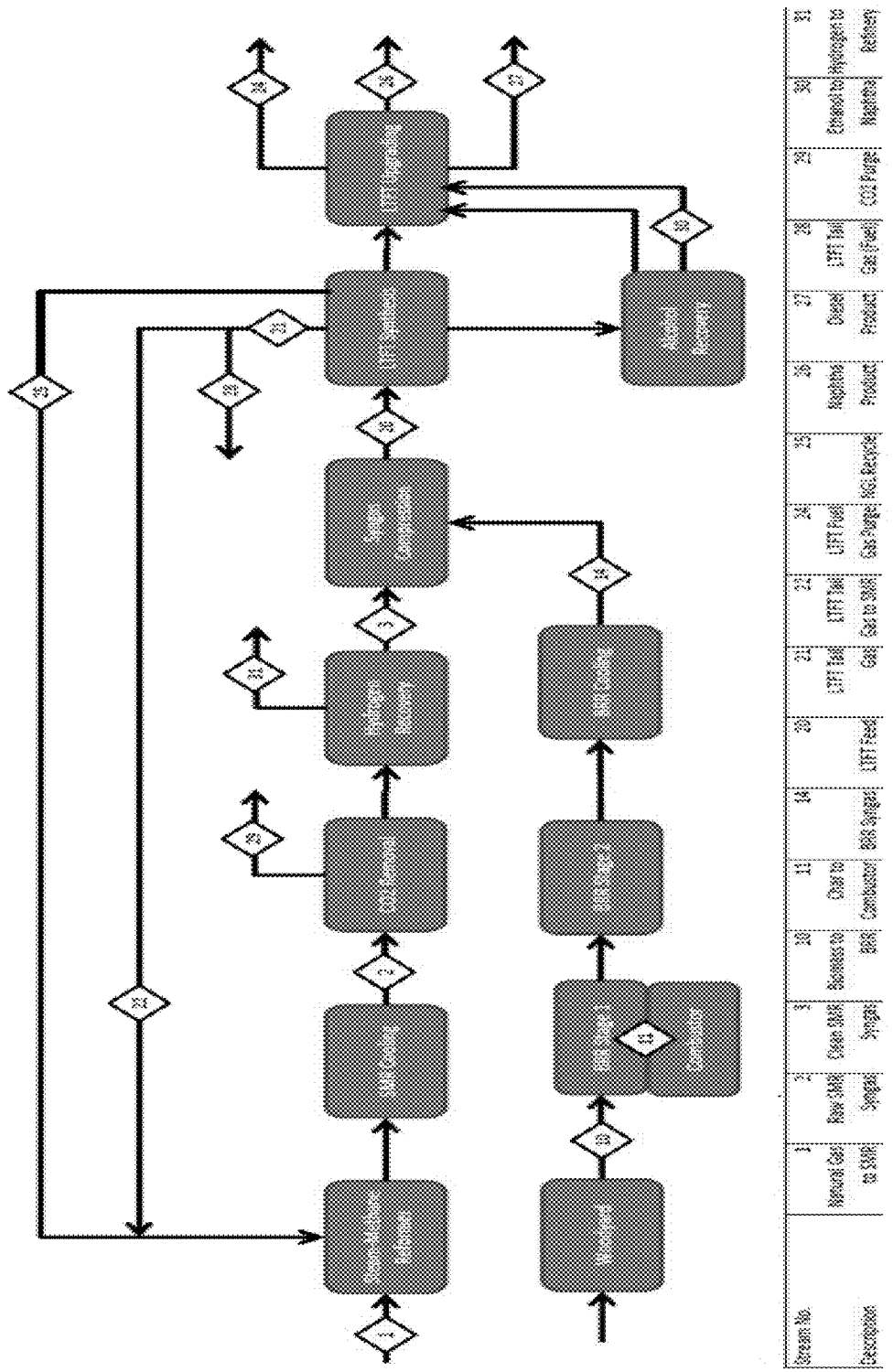
FIG. 1A illustrates a block diagram of an embodiment of the integrated plant with a Low Temperature Fischer-Tropsch train and recycle loops that recycle products back to either the steam-methane reformer or the second stage of the bio reforming reactor.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific chemicals, named components, connections, types of heat sources, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. Features disclosed in one embodiment may be utilized in another embodiment where it makes sense. The specific details may be varied from and still be contemplated to be within the spirit and scope of the present design.

In general, a number of example processes for and apparatuses associated with a biomass conversion to transportation fuels using a Fischer-Tropsch process are described. The following drawings and text describe various example implementations for an integrated plant using the biomass conversion to transportation fuels using a Fischer-Tropsch process. In an embodiment, the integrated plant contains at least a steam expansion unit, a bio reforming reactor to generate syngas from biomass from the stream explosion unit, a steam methane reformer in parallel with bio reforming reactor, and a Fischer-Tropsch reactor train that uses both syngas product derived from the steam biomass reforming in the bio reforming reactor and syngas from the steam methane reforming reactor. The Fischer-Tropsch (FT) reactor couples to the bio reforming reactor as well as the steam methane reforming reactor. Several of the Fischer-Tropsch units recycle various components of the product slate from the Fischer-Tropsch process back to the steam methane reforming reactor and the bio reforming reactor. The product slate from High Temperature Fischer-Tropsch allows higher production of gasoline and diesel, a more valuable product slate than merely the gasoline or LPGs produced from the MTG process.

Figure 10:
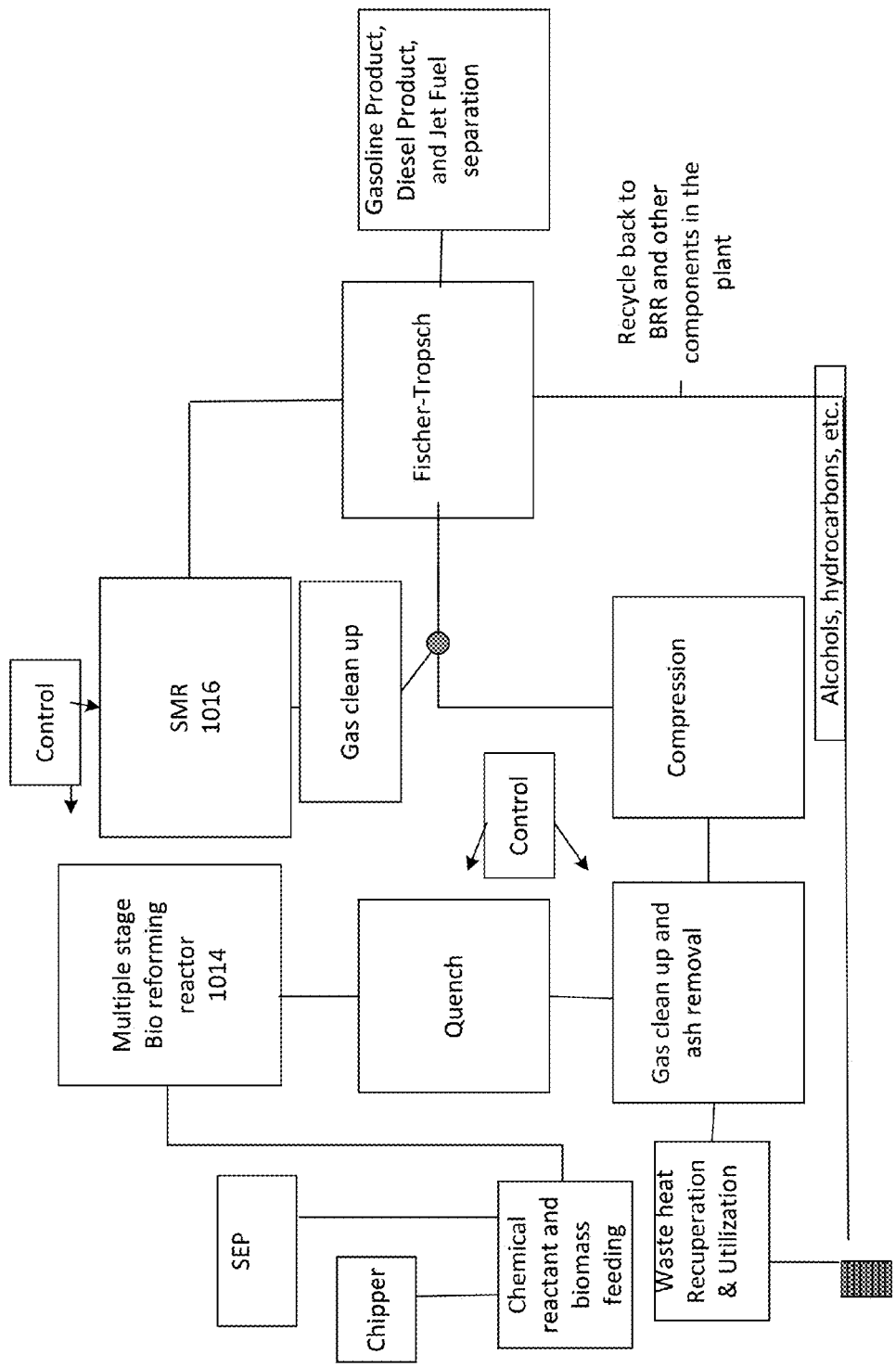
FIG. 10 illustrates a block diagram of an embodiment of the integrated plant to generate chemical grade syngas from a steam biomass reforming in a bio reforming reactor for either a high temperature or low temperature Fischer-Tropsch fuel production from biomass.

FIG. 10 illustrates a block diagram of an embodiment of the integrated plant to generate chemical grade syngas from a steam biomass reforming in a bio reforming reactor for either a high temperature or low temperature Fischer-Tropsch fuel production from biomass. The integrated plant generates chemical grade syngas from a biomass in a steam biomass reforming reactor 1014 for use with either a high temperature or low temperature Fischer-Tropsch synthesis process to produce fuel from biomass. The integrated plant uses technologies to convert synthesis gas produced from biomass, and in some embodiments synthesis gas from biomass and natural gas, into liquid transportation fuels. The basic process flow combines a steam methane reformer (SMR) 1016 with a multiple stage bio reforming reactor 1014 biomass to produce a mixture of syngas. In some embodiments, natural gas is fed to the steam-methane reformer 1016 and biomass is fed to the bio reforming reactor 1014. The steam-methane reformer 1016 provides hydrogen to correct the composition of the relatively hydrogen-poor biomass-derived syngas so that the combined stream is suitable for chemical synthesis in a Fischer Tropsch process. The flow can be optimized for Fischer Tropsch by recovering most of the hydrogen from the Fischer Tropsch tail gas and combining that hydrogen (H2) back into the Fischer Tropsch fresh feed gas. This recycling of additional H2 into the input of the Fischer Tropsch synthesizer train reduces the required capacity of the steam-methane reformer 1016 by: 1) reducing the volume of hydrogen flow through the SMR; and 2) increasing the steam-methane reformer 1016 performance by shifting the methane reforming equilibrium towards higher methane and steam conversion.

The biomass feed system can include a chipper, a steam expansion unit, dryer, lock hoppers, and other similar components. Moisture values in the incoming biomass in chip form can vary from about 10% to 60% for the biomass. Chips of biomass may be generated by the chipper unit cooperating with some filters with dimensions to create chips of less than about one inch and on average about 0.5 inches in average length and a ¼ inch in thickness on average.

In an embodiment, the chipper unit may feed chips of biomass to the steam expansion unit or to a lock hopper with or without drying the powder to feed the first stage of the bio reforming reactor 1014. The bio reforming reactor 1014 is configured to receive two or more types of biomass feed stocks, where the different types of biomass include 1) soft woods, 2) hard woods, 3) grasses, 4) plant hulls, and 5) any combination that are blended and potentially steam expansion processed within the steam explosion unit into particles. The biomass is subsequently collected and then fed as a homogenized 1) torrefied feedstock or 2) dried particles or 3) even wet particles into the bio reforming reactor 1014. Again the biomass may also be fed as chips.

A steam expansion unit (SEP) can be used to make biomass particles. Chips of biomass are fed on a conveyor or potentially placed in a pressure vessel in the thermally decomposing stage in the steam expansion unit that starts a decomposition, hydrating/moistening, and softening of the chips of biomass using initially low-pressure saturated steam. The low-pressure saturated steam may be at 100 degrees C. The system may also inject some flow aids at this point, such as recycled ash from the bio reforming reactor 1014, to prevent clogs and plugging by the biomass chips.

The steam expansion unit has an input cavity to receive biomass as a feedstock, one or more steam supply inputs, and two or more stages to pre-treat the biomass for subsequent supply to a bio reforming reactor 1014. The stages use a combination of heat, pressure, and moisture that are applied to the biomass to make the biomass into a moist fine particle form. The steam expansion process breaks down a bulk structure of the received biomass, at least in part, by applying steam from a low pressure steam supply input to begin degrading bonds between lignin and hemi-cellulose from cellulose fibers of the biomass and increase a moisture content of the received biomass. In the last stage, steam at at least ten times atmospheric pressure from a high pressure steam supply input is applied to heat and pressurize any gases and fluids present inside the biomass to internally blow apart the bulk structure of the received biomass via a rapid depressurization of the biomass with the increased moisture content and degraded bonds. In the steam expansion stage, the softened and hydrated chips of biomass are exposed to high temperature and high-pressure steam for a sufficient time period, such as 3 minutes to 15 minutes, to create high pressure steam inside the partially hollow cellulose fibers and other porous areas in the bulk structure of the biomass material.

The created moist fine particles may be, for example, 20-50 microns thick in diameter and less than 100 microns in length on average. Note, 1 inch=25,400 microns. Thus, the biomass comes from the chipper unit as chips up to 1 inch in length and 0.25 inches in thickness on average and go out as moist fine particles of 20-50 microns thick in diameter and less than 100 microns in length on average, which is a reduction of over 2000 times in size. The violent explosive decompression of the saturated biomass chips occurs at a rate swifter than that at which the saturated high-pressure moisture in the porous areas of the biomass in chip form can escape from the structure of biomass.

The produced fine particles of biomass are fed downstream to the bio reforming reactor 1014 for the rapid steam biomass reforming reaction in a reactor of the bio reforming reactor 1014 because they create a higher surface to volume ratio for the same amount of biomass compared to the received biomass in chip form, which allows a higher heat transfer to the biomass material and a more rapid thermal decomposition and gasification of all the molecules in the biomass.

The bio-reforming reactor 1014 converts the solid particles of biomass from the bio particle preparation step into gaseous reactants including $CH_4$, $H_2$, $CO_2$, & $CO$. The syngas produced by the bio reforming reactor 1014 is low in carbon dioxide because by design a substantially stoichiometric amount of steam is supplied into the reactor and no additional oxygen is supplied as a reactant or fuel to drive the reaction in the biomass gasification reaction. Thus, a very low amount of $O_2$ is present and the steam biomass reforming reaction produces mainly CO rather than $CO_2$.

The syngas from the biomass reforming reactor is also low in nitrogen, low in ammonia, low in sulfur content, and low in hydrogen cyanide (HCN). For example, the sulfur content of the syngas gas coming out of the bio reforming reactor 1014 is barely over one part per million. The woodchips used to produce the particles of biomass generally have a low sulfur content. Barely trace amounts of HCN, ammonia, are generated and trace amounts of nitrogen are present making the syngas virtually free of nitrogen, ammonia, and HCN, in the syngas stream coming out of the bio reforming reactor 1014. Syngas from coal contains high quantities of sulfur, amine, and HCN. Accordingly, the syngas cleanup components downstream of the bio reforming reactor 1014 can be less inclusive and exclude some of the gas cleanup components needed for other biomass syngas producers, such as a coal-based syngas. Thus, compared to a coal-based syngas, an ammonia removal plant is not needed, a HCN removal plant is not needed, a nitrogen purge is not needed, and merely either the bulk sulfur removal or a sulfur guard bed is needed but not both.

Figure 9:
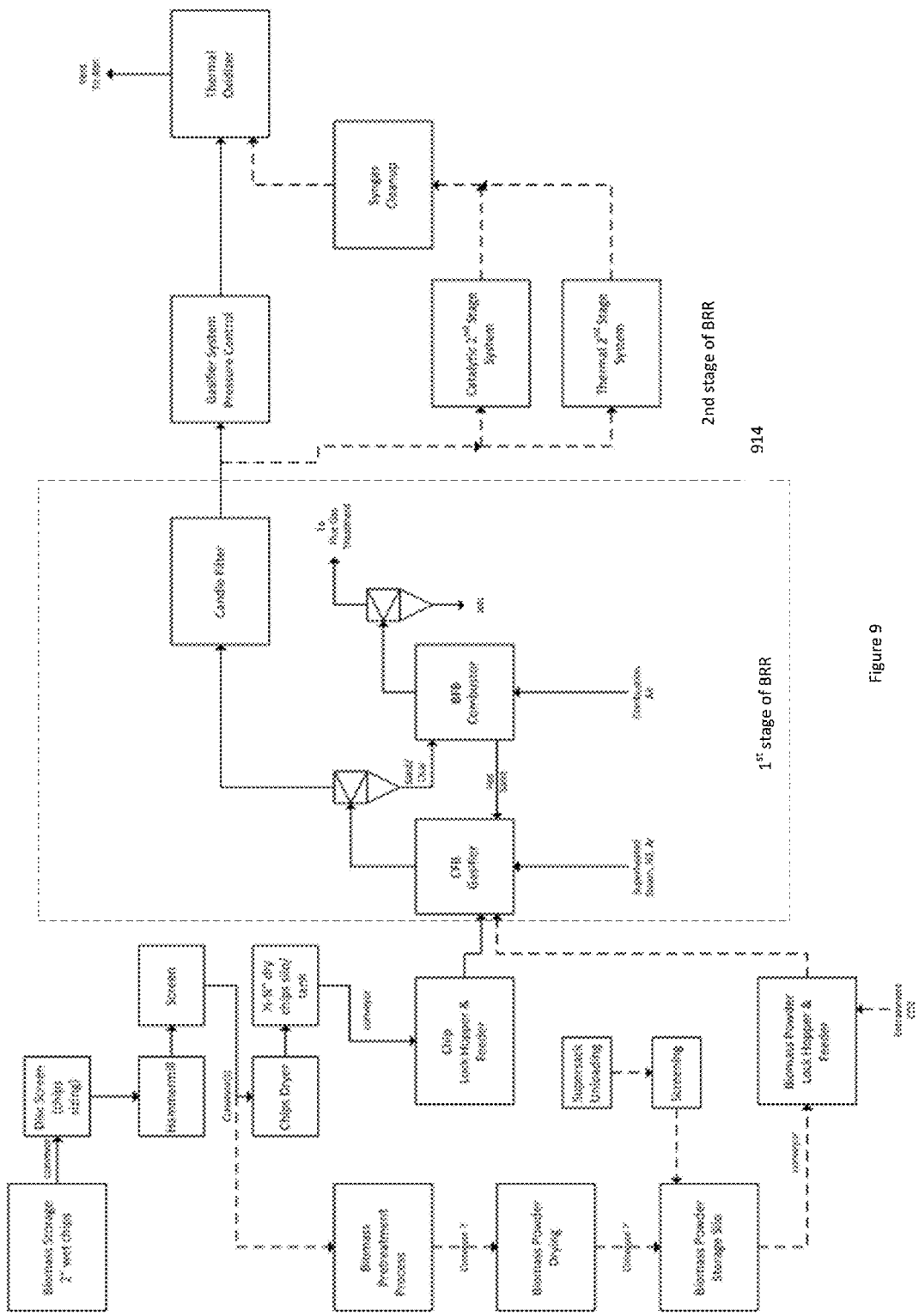
FIG. 9 illustrates a block diagram of an embodiment of an interconnected set of two or more stages forming the bio reforming reactor and the biomass feed system to the first stage of the bio reforming reactor.

In an embodiment, an interconnected set of two or more stages forms the bio reforming reactor 1014. A first stage may structurally include a circulating fluidized bed reactor that circulates a heat absorbing media, such as silica sand, olivine, catalytically active solids, or some combination. The first stage also structurally includes one or more steam inputs and one or more biomass feedstock supply lines into the circulating fluidized bed reactor of the first stage. The first stage also has a reactor structured and configured so that the circulating fluidized bed reactor causes a chemical devolatilization of the biomass feedstock from the biomass feedstock supply lines into its constituent gases of carbon monoxide (CO), $H_2$, carbon dioxide ($CO_2$), methane ($CH_4$), tars, chars and other components into a raw syngas mixture. The first stage may contain a combustor to provide heat for the gasifier portion of the first stage. (See FIG. 9) The second stage has a feed input to receive the raw syngas mixture generated in the first stage. The second stage is also structured and configured to perform further reforming of the raw syngas from the first stage into the chemical grade syngas by further applying heat and pressure to chemically crack at least the tars and/or reform the methane into their corresponding syngas molecules so that the resultant syngas stream can be used in other chemical reactions rather than just being a source of fuel for burning. (See for example FIG. 9) FIG. 9 illustrates a block diagram of an embodiment of the interconnected set of two or more stages forming the bio reforming reactor 914 and the biomass feed system to the first stage of the bio reforming reactor 914.

Referring to FIG. 10, the second stage has an exit port that feeds the chemical grade syngas derived from the steam biomass reforming in this bio reforming reactor 1014 to a downstream high temperature or low temperature Fischer-Tropsch train for the Fischer-Tropsch synthesis process to produce the fuel from the biomass.

Note, the biomass feed to the bio reforming reactor 1014 maybe powdered biomass or chips while the biomass feed to the fuel gas production unit is generally wood chips. Both feeds can be dried to about 10% moisture.

The two-stage biomass reforming reactor (BRR) 1014 design produces chemical grade syngas that generates gasoline with at least 15% less lifecycle greenhouse gas emissions than petroleum-derived gasoline. The two-stage biomass reforming reactor 1014 and the steam-methane reformer 1016 both produce syngas components, from biomass and natural gas respectively, in order to meet a greenhouse gas reduction target. A portion of the plant fuel demand is met with fuel gas produced from biomass rather than natural gas, and that causes a reduction in greenhouse gas. The first stage of the bio reforming reactor 1014 may be a circulating fluidized bed design while the second stage may be an externally heated catalytic reactor with 2-8% methane slip.

Referring to FIG. 9, the second stage of the bio reforming reactor 914 may be a catalytic reactor operating between 1200 degrees F. to 1600 degrees F., and preferably at about 1,470° F., with the outlet gas at thermodynamic equilibrium. This results in complete conversion of all hydrocarbons to syngas except methane, which slips from the second stage at 4% (vol., dry gas basis). Thus, the steam-methane reformer 914 may structurally be an externally fired, catalytic reactor that converts natural gas and other light hydrocarbons to synthesis gas.

The second stage of the bio reforming reactor 914 may also be a thermal reactor operating between 900 degrees C. to 1500 degrees C. and operates without a catalyst to result in substantially a complete conversion of all hydrocarbons greater than 90% to syngas.

Referring to FIG. 10, the steam methane reformer 1016 combines with the biomass reformer reactor 1014 to produce syngas products to be supplied to an input of the downstream Fischer-Tropsch train. The steam-methane reformer 1016 provides hydrogen to correct a composition of a hydrogen to carbon monoxide ratio of the biomass-derived syngas supplied to the input of the downstream Fischer-Tropsch train so that the combined stream is at a suitable H2 to CO ratio for chemical synthesis for the Fischer-Tropsch train. The steam-methane reformer 1016 converts light hydrocarbons and oxygenates at a thermodynamic equilibrium by the time these chemical reactants reach the outlet of the steam-methane reformer 1016.

The steam methane reforming feedstocks may combine up to four streams to generate the total hydrocarbon feedstock to the SMR. 1) A first stream is the tail gas recycled (up to 67% of total) from the F-T synthesis unit. 2) A second stream of LPG is the NGL by-product from the Oligomerization unit of the refining stage of the F-T train that is recycled as feed to the SMR. 3) A third stream of Natural Gas can come from a natural gas supply line feed to the steam-methane reformer. 4) A fourth stream of methane based gas is derived from biomass fed into the fuel gas production unit, typically when the natural gas supply is scarce. Another input is the required steam from a boiler to the steam-methane reformer reactor. The controller and sensors cooperate to measure the amount of hydrocarbon and water in the feed stream to the steam-methane reformer and then adds a sufficient amount of steam to the feed to yield a steam to carbon ratio, for example, of 2.8 on a molar basis.

In an embodiment of the steam-methane reformer, a preheat exchanger heats the temperature of the steam-methane reformer feed stream, for example, to at least 1,020° F. (549° C.). The feed then enters the steam-methane reformer via a conventional feed distribution arrangement of sub-headers, manifolds and inlet pigtails. The Reformer uses additional steam to drive the steam methane reforming reaction towards equilibrium with a low concentration of unconverted methane.

Steam Methane Reforming CH4+H2O ⇔ CO+3H2

Water Gas Shift CO+H2O ⇔ CO2+H2

Heavy Hydrocarbons Reforming C$n$H$m+n$
H2O ⇔ $n$CO+($\frac{1}{2}m+n$)H2

Steam reforming takes place at elevated temperatures in the Reformer. This is a rectangular insulated structure containing vertically supported tubes filled with catalyst. The endothermic heat of reaction is supplied from downward firing burners situated in the roof of the Reformer. These are fired on a mixture of combined process waste gas streams supplemented with a mixture of natural gas, and purge streams from the fuel gas header. The burners are arranged in rows between the reforming tubes and are positioned such that no flame impingement occurs on the tubes or on the furnace walls. The natural gas and steam reactants are evenly distributed by a system of headers on the top of the reforming furnaces and the connections to each tube are made by solid drawn alloy 'pigtails'.

The reformer converts the feedstock to a mixture of carbon monoxide, carbon dioxide, hydrogen and methane; this mixture is commonly known as synthesis gas (syngas). The reforming reaction absorbs great quantities of heat at high temperature so waste heat is available in two streams—the reformed (synthesis) gas and the flue gas—which is used to provide heat for other parts of the process. The reformed gas leaves the reformer at 1616° F. and approximately 305 psia and passes from the individual tubes into the reformed gas headers through outlet 'pigtails' and on to the heat recovery equipment.

Example, Steam-Methane Reformer Syngas Product

After exiting the reactors, the steam-methane reformer syngas products are cooled to, for example, 180° F. (82° C.) in a cooler and the resulting condensate is separated from the syngas in a separator to make a stream of steam-methane reformer condensate. The stream of cooled syngas enters a splitter tee where the entrainment gas stream is split off the main syngas flow. Note, the entrainment gas may only be required for entrained flow type gasifiers, and the high temperature Fischer-Tropsch train may have no entrainment gas flow requirement. Thus, the hot reformed gas at first may enter the Reformed Gas Boiler, where it is cooled by generating HP steam. The reformed gas then passes to the HP Boiler Feed Water Heater, where it is further cooled by preheating boiler feed water. These units, together with Radiant Shield Boiler, generate major portion of high pressure steam used in the plant to drive the main Syngas Gas Compressor/Circulator Turbine.

Syngas Compression

Synthesis gas from the biomass reformer forms a stream of bio syngas. This stream from the bio reforming reactor stage 2 outlet is mixed with the steam-methane reformer syngas, the clean syngas, in a mixer. A number of unit operations are included to compress and cool the combined syngas to, for example, 115° F. and 430 PSIA. Condensed water is removed from the syngas to meet the input specifications of the F-T synthesis loop.

Likewise, the second stage of the bio reforming reactor 1014 couples to a reaction gas cooling system and a syngas clean up stage. The bio syngas is feed to its own compression stage or mixed with the clean syngas in a common compression stage.

The Steam Methane Reformer (SMR) reactor connects in parallel to and is configured to cooperate with the bio reforming reactor 1014 to produce a syngas mixture for Fischer-Tropsch synthesis. The chemical grade syngas of the bio reforming reactor 1014 and chemical reaction products of the steam methane reformer 1016 are combined to achieve a proper Hydrogen (H2) to Carbon Monoxide (CO) ratio between 1.5 to 2.4 for the Fischer-Tropsch synthesis, with either a cobalt (Co) catalyst or an iron (Fe) catalyst, and does not include a water gas shift stage to adjust the H2 to CO ratio. Two or more control systems (see FIG. 10) monitor a chemical composition feedback signal of a first stream of chemical grade syngas from the bio reforming reactor 1014 and a second stream of the hydrogen-rich reaction products from the steam methane reformer 1016 with two or more sensors to produce the proper amount of H2 to CO ratio. In general, the H2 to CO ratio of the syngas supplied meets the listed ratio range required by the FT synthesis specification. In an embodiment, the syngas from the bio reforming reactor 1014 is mixed with the syngas from the steam-methane reformer to feed the high temperature or low temperature Fischer-Tropsch train.

In an embodiment, the plant sensors monitor a different ratio called the Ribblett ratio which takes into account the CO2 content of the inlet syngas for the high temperature Fischer-Tropsch train. This may be an important factor as the CO2 conversion in the HTFT process represents a significant advantage for high temperature Fischer-Tropsch over low temperature Fischer-Tropsch. The Ribblet ratio may be H2 divided (2 times CO plus 3 times CO2) on a molar basis.

An example high temperature Fischer-Tropsch train may have the mixed syngas feed preheated to 450° F. (232° C.) by a cross-exchange with a product stream in a heat exchanger. The preheated feed then enters a conversion reactor, where the syngas goes through iterative chemical reaction loops to be converted to the F-T slate of products.

An example low temperature Fischer-Tropsch train may have an operating temperature of less than or equal to 230 degrees C., and combines with a low temp Fischer-Tropsch upgrading and refiner stage to produce a greater amount of diesel fuel product than gasoline product.

An external recycle loop connects downstream to the Fischer-Tropsch train. The high temperature or low temperature Fischer-Tropsch train has an exit tail gas section in which a H2 separator, which is selected from any of i) a pressure swing absorber separator, ii) a temperature swing absorber separator, iii) a hydrogen separation membrane, or iv) a combination of the three, is used to molecularly separate, via for example a sieve with pores/small hole sizes, H2 from the exit tail gas. The primary advantage of the hydrogen recovery step is to recover hydrogen that would otherwise be discarded to help manage the hydrogen to carbon ratio in the feed syngas. In addition, the H2 separator recycles the H2 recovered back into a syngas compression stage to be co-fed with the chemical grade syngas from the second stage of the bio reforming reactor 1014 and the H2 rich gas from the steam-methane reformer into the input of the high temperature or low temperature Fischer-Tropsch train to reduce a required capacity of the steam-methane reformer by 1) reducing a volume of hydrogen flow through the SMR, and 2) increasing the steam-methane reformer performance by shifting a methane reforming equilibrium towards higher methane and steam conversion.

When the plant recycles a smaller portion of the Fischer-Tropsch train tail gas to the steam-methane reformer, then that increases the methane and water conversion in the steam-methane reformer while reducing the steam-methane reformer size and fuel demand. In this case, the recovered hydrogen is added back to the Fischer-Tropsch feed syngas to help manage the Ribblett ratio.

Figure 6A:
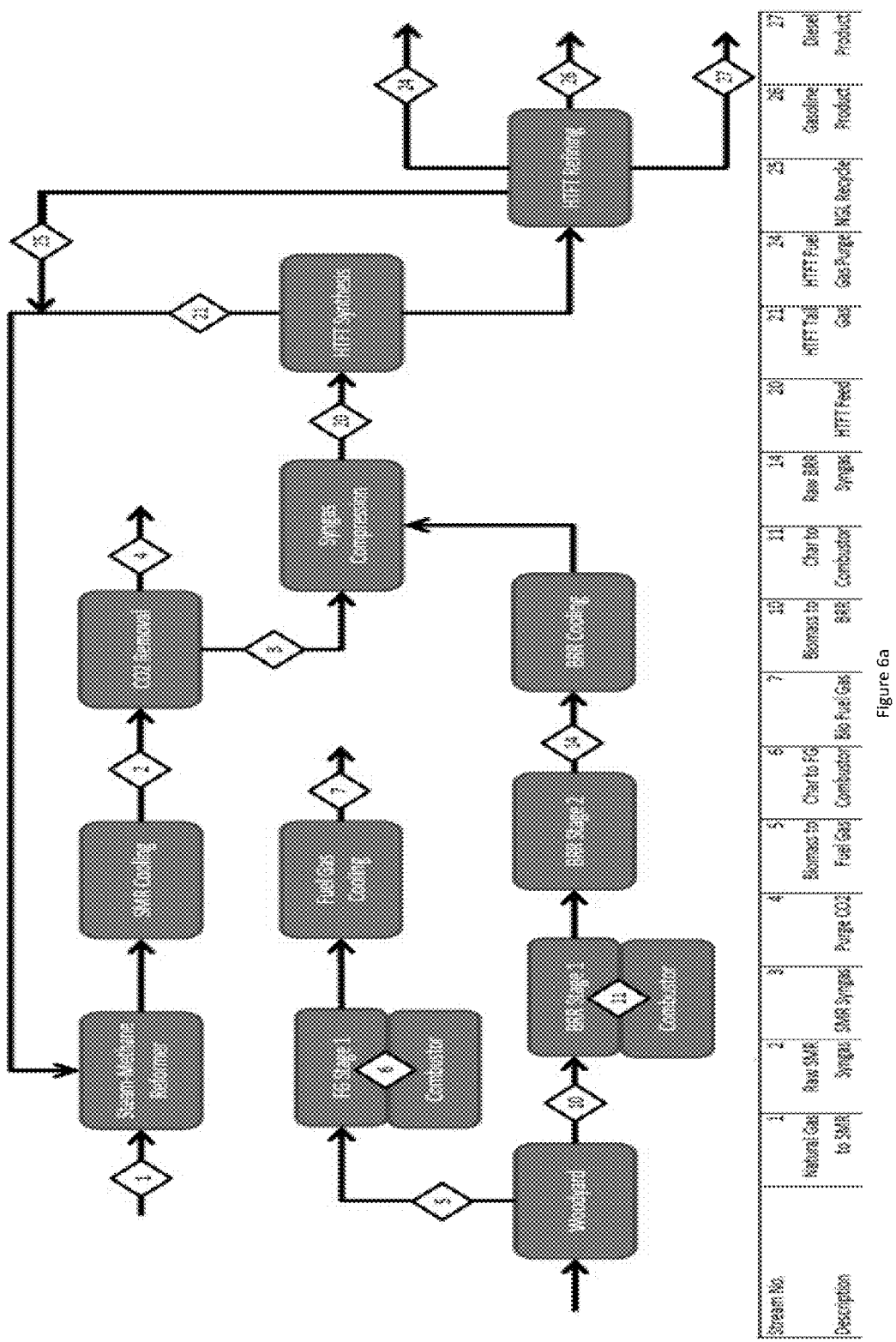
FIG. 6A illustrates a block diagram of an embodiment of a High Temperature Fischer-Tropsch with external recycle loops, a biomass fuel gas generation unit, and a multiple stage bio reforming reactor.
Figure 6B:
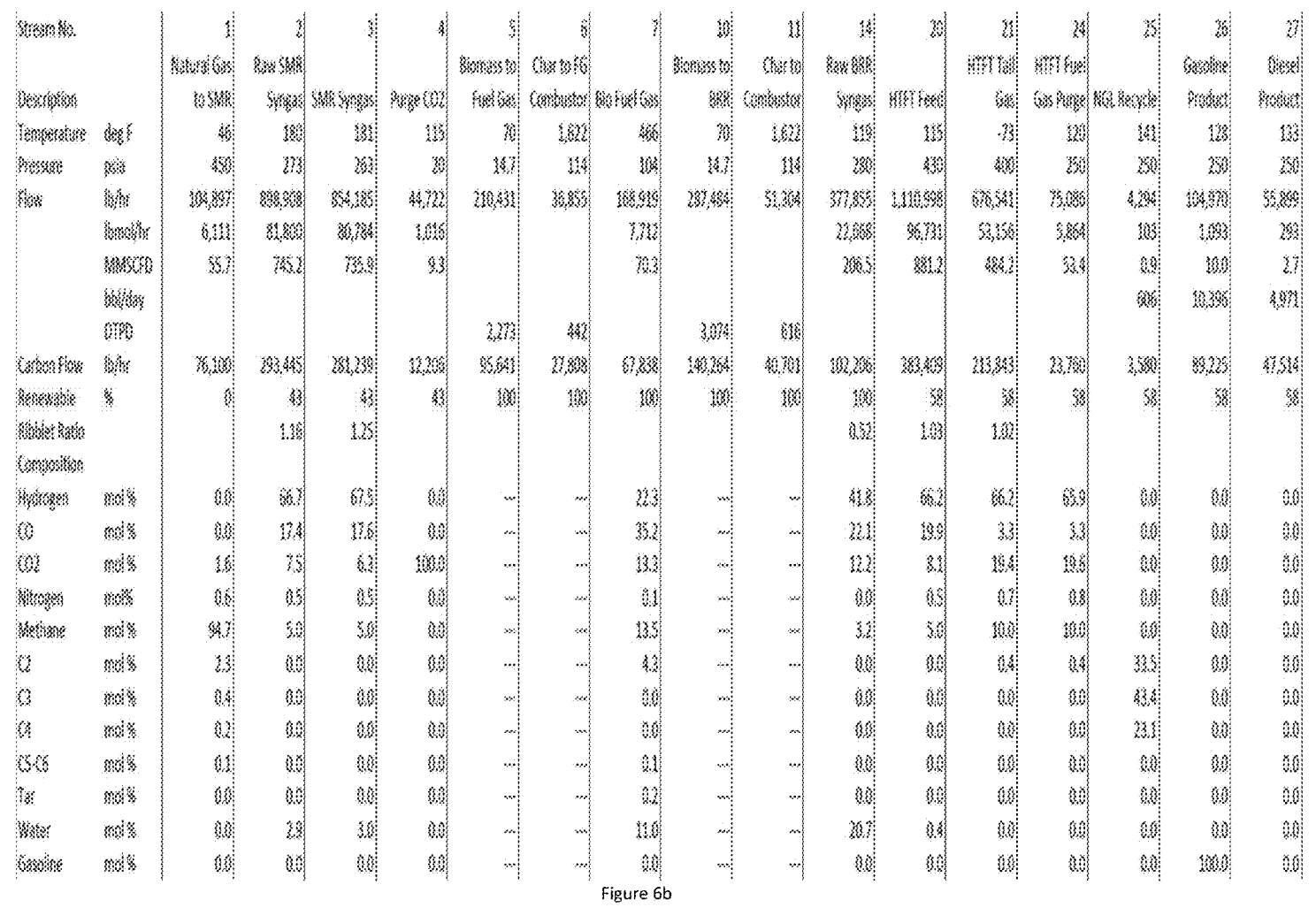

FIG. 6A illustrates a block diagram of an embodiment of a high temperature Fischer-Tropsch (HTFT Synthesis) with an external recycle loop, a biomass fuel gas generation unit, and a multiple stage bio reforming reactor. This embodiment does not have a natural gas feedstock supplied to the steam methane reformer but rather is a biomass only feedstock implementation. The wood yard biomass feed system has one or more supply lines coupled to a fuel gas generation unit (FG Stage 1) to generate a clean source of fuel for the steam methane reformer and the biomass reformer. The wood yard biomass feed system also includes the one or more biomass feedstock supply lines into the circulating fluidized bed reactor of the first stage and the one or more supply lines coupled to the fuel gas generator. The biomass fuel gas generator may be a single stage design using the circulating fluidized beds to produce syngas with about 14% (mole %, dry basis) methane concentration. Some of the biomass feedstock is supplied for the bio reforming reactor (BRR Stage 1) and some biomass feedstock is supplied to the fuel gas generator to create the methane-rich fuel gas fuel for heaters in the steam methane reformer and biomass reformer. The fuel gas generator creates bio-derived feed stock for use as fuel gas in the plant.

The high temperature Fischer-Tropsch process may be configured to produce enhanced olefin yield based on predicted yields for a new precipitative catalyst formulation. The natural gas liquid (NGL) by-product from the high temperature Fischer-Tropsch process is sent to an oligomerization unit (COD), where the olefins in the NGL are oligomerized to gasoline and diesel range components with a product split, for example, of 55% gasoline and 45% diesel. The paraffins and unconverted olefins from the Oligomerization unit are recycled via the recycle loop back to the steam-methane reformer as feedstock. In an embodiment, alcohols recovered from the high temperature Fischer-Tropsch process water may be sent to the oligomerization unit where they are dehydrated and oligomerized to gasoline and diesel range components. Unconverted alcohols from the oligomerization unit may be combined with wastewater along with the balance of the water and other oxygenates from the high temperature Fischer-Tropsch process to be used as source for the steam supplied to the bio reforming reactor and the steam methane reformer. Heavy gas oil (HGO) from the high temperature Fischer-Tropsch process can be hydrocracked to diesel range components. The tail gas from the high temperature Fischer-Tropsch process can be arbitrarily split with 90% of the tail gas recycling to the steam-methane reformer as feedstock. The remaining 10% of the tail gas may be used to supply hydrogen to the hydrocracker and then burned as fuel gas to offset fuel gas consumption. The balance between natural gas and biomass-derived fuel gas is manipulated to maintain the same reduction in greenhouse gas emissions per gallon of product. The Natural Gas Liquids (NGL) that is recycled back into the plant may include C3 and C4 olefins and paraffins. The Conversion of Olefins to Distillate products (COD) in oligomerization unit uses several processes to convert low molecular weight olefins to higher molecular weight gasoline and diesel range components. The alcohols may be recovered and routed to the oligomerization unit for conversion to hydrocarbon products.

The Fischer-Tropsch process in the Fischer-Tropsch train is a collection of chemical reactions that converts a mixture of carbon monoxide and hydrogen into liquid hydrocarbons. The Fischer-Tropsch process involves a series of chemical reactions that produce a variety of hydrocarbons, ideally having the formula $(C_nH_{(2n+2)})$. Some example reactions produce alkanes as follows:

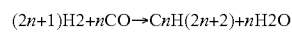

$$(2n+1)H_2 + nCO \rightarrow C_nH_{(2n+2)} + nH_2O$$

Where n is typically 10-20. Most of the alkanes produced tend to be straight chain, suitable such as diesel fuel. In addition to alkane formation, competing reactions give small amounts of alkenes, as well as alcohols and other oxygenated hydrocarbons. The HT Fischer-Tropsch and LT Fischer-Tropsch processes produce different amounts of olefins. HTFT produces a much more olefin rich syncrude than does LTFT, which affords better recycling back to other parts of the integrated plant. Converting a mixture of H2 and CO into aliphatic products with long hydrocarbon chains is generally a multi-step reaction with several sorts of intermediates.

High Temperature Fischer-Tropsch Reactor

The high temperature Fischer-Tropsch train may have the mixed syngas feed preheated to up to 450° F. (232° C.) by a cross-exchange with a product stream in a heat exchanger. The preheated mixed syngas feed then enters a conversion reactor, where the syngas goes through iterative chemical reaction loops to be converted to the F-T slate of products. The Table below summarizes the high temperature Fischer-Tropsch reactions. The example HTFT reactor operating conditions can be 640° F. (338° C.) and 425 PSIA.

Example High Temperature Fischer-Tropsch Product Reactions

| Product | Stoichiometry | Carbon Numbers |
|---|---|---|
| (3) Paraffin | $nCO + (2n + 1)H_2 \rightarrow C_nH_{(2n+2)} + nH_2O$ | 1-30 |
| (4) Olefin | $nCO + (2n)H_2 \rightarrow C_nH_{(2n)} + nH_2O$ | 2-30 |
| (5) Alcohol | $nCO + 2nH_2 \rightarrow C_nH_{(2n+2)}O + (n - 1)H_2O$ | 1-5 |
| (6) Aldehyde | $nCO + (2n - 1)H_2 \rightarrow C_nH_{(2n)}O + (n - 1)H_2O$ | 2-3 |
| (7) Ketone | $nCO + (2n - 1)H_2 \rightarrow C_nH_{(2n)}O + (n - 1)H_2O$ | 3-5 |
| (8) Acid | $nCO + (2n - 2)H_2 \rightarrow C_nH_{(2n)}O_2 + (n - 2)H_2O$ | 2-4 |

Example Carbon selectivity for each of the high temperature Fischer-Tropsch products is detailed in the Table below.

| Product | Selectivity |
|---|---|
| $CH_4$ | 7.961% |
| $C_2H_4$ | 6.404% |
| $C_2H_6$ | 0.747% |
| $C_3H_6$ | 12.51% |
| $C_3H_8$ | 0.477% |
| $C_4H_8$ | 9.756% |
| $C_4H_{10}$ | 0.241% |
| $C_5H_{10}$ | 9.300% |
| $C_5H_{12}$ | 0.476% |
| $C_6H_{12}$ | 5.924% |
| $C_6H_{14}$ | 0.305% |
| $C_7H_{14}$ | 8.049% |
| $C_7H_{16}$ | 0.415% |
| $C_8H_{16}$ | 6.194% |
| $C_8H_{18}$ | 0.320% |
| $C_9H_{18}$ | 4.766% |
| $C_9H_{20}$ | 0.247% |
| $C_{10}H_{20}$ | 3.697% |
| $C_{10}H_{22}$ | 0.192% |
| $C_{11}H_{22}$ | 2.848% |
| $C_{11}H_{24}$ | 0.148% |
| $C_{12}H_{24}$ | 2.195% |
| $C_{12}H_{26}$ | 0.114% |
| $C_{13}H_{26}$ | 1.691% |
| $C_{13}H_{28}$ | 0.088% |
| $C_{14}H_{28}$ | 1.303% |
| $C_{14}H_{30}$ | 0.068% |
| $C_{15}H_{30}$ | 1.004% |
| $C_{15}H_{32}$ | 0.052% |
| $C_{16}H_{32}$ | 0.773% |
| $C_{16}H_{34}$ | 0.040% |
| $C_{17}H_{34}$ | 0.596% |
| $C_{17}H_{36}$ | 0.031% |
| $C_{18}H_{36}$ | 0.459% |
| $C_{18}H_{38}$ | 0.024% |
| $C_{19}H_{38}$ | 0.354% |
| $C_{19}H_{40}$ | 0.018% |
| $C_{20}H_{40}$ | 0.273% |
| $C_{20}H_{42}$ | 0.014% |
| $C_{21}H_{42}$ | 0.904% |
| $C_{21}H_{44}$ | 0.047% |
| $C_{22}H_{44}$ | 0.762% |
| $C_{22}H_{46}$ | 0.040% |
| $C_{23}H_{46}$ | 0.642% |
| $C_{23}H_{48}$ | 0.034% |
| $C_{24}H_{48}$ | 0.541% |
| $C_{24}H_{50}$ | 0.028% |
| $C_{25}H_{50}$ | 0.456% |
| $C_{25}H_{52}$ | 0.024% |
| $C_{26}H_{52}$ | 0.385% |
| $C_{26}H_{54}$ | 0.020% |
| $C_{27}H_{54}$ | 0.324% |
| $C_{27}H_{56}$ | 0.017% |
| $C_{28}H_{56}$ | 0.273% |
| $C_{28}H_{58}$ | 0.014% |
| $C_{29}H_{58}$ | 0.230% |
| $C_{29}H_{60}$ | 0.012% |
| $C_{30}H_{60}$ | 0.194% |
| $C_{30}H_{62}$ | 0.010% |
| $CH_3OH$ | 0.037% |
| $C_2H_5OH$ | 1.968% |
| $C_3H_7OH$ | 0.644% |
| $C_4H_9OH$ | 0.406% |
| $C_5H_{11}OH$ | 0.089% |
| $C_2H_4O$ | 0.111% |
| $C_3H_6O$ | 0.066% |
| $C_2H_6CO$ | 0.449% |
| $C_3H_8CO$ | 0.135% |
| $C_4H_{10}CO$ | 0.051% |
| $CH_3COOH$ | 0.657% |
| $C_2H_5COOH$ | 0.181% |
| $C_3H_7COOH$ | 0.175% |

The example chemical products from the Fischer-Tropsch reactor may be split. The C6 and higher molecules in the chart may be sent as products to the refiner stage to be made into a transportation fuel product. The C5 and lower molecules in the chart may be included in the tail gas that is recycled in the integrated plant.

In this example, the CO conversion in the high temperature Fischer-Tropsch reactor is assumed to be 90% including the conversion to CO2 by water gas shift. The reactor operating conditions are defined, for example, as 644° F. (338° C.) and 425 psia. The high temperature Fischer-Tropsch catalyst may be iron-based, which is known to be catalytically active for a water gas shift reaction.

In an embodiment, the mixed syngas is fed to a high temperature Fischer-Tropsch (HTFT) unit to generate a slate of products from methane through waxes, including some water soluble oxygenated hydrocarbons. The high temperature Fischer-Tropsch train has a conversion loop unit that contains the Fischer-Tropsch reactor train. The conversion loop produces a wide slate/range of products from the incoming syngas including gasoline, diesel, and middle distillate that can be made into jet fuel. The high temperature Fischer-Tropsch Reactor train may operate at a temperature from 280° C. to 400° C. with an iron catalyst. Higher temperatures lead to faster reactions and higher conversion rates but also tend to favor methane production. In other technologies, the temperature is usually maintained at the low to middle part of the range to minimize the production of methane. The high temperature Fischer-Tropsch train may operate with an operating pressure between 250 to 600 PSIG. Increasing the pressure leads to higher conversion rates and also favors formation of long-chained alkanes, both of which are desirable. However, in some instances higher pressures can lead to catalyst deactivation via coke formation. The catalyst of the high temperature Fischer-Tropsch train being iron-based may tolerate up to about one part per million of sulfur in the incoming syngas without poisoning that catalyst.

In an embodiment, the high temperature Fischer-Tropsch reactor train has a HTFT process water treating unit. The plant may recover as much as carbon and concentrate them back into the bio reforming reactor. The HTFT process water treating unit has a membrane separator to separate out clean water from water that is still somewhat contaminated. The membrane separator concentrates alcohols and other oxygenated hydrocarbons and then directs the dirty water with the concentrated alcohols and other oxygenated hydrocarbons to the waste heat boiler unit and steam superheater unit. The waste heat boiler has a recycle loop coming from the Fischer-Tropsch process water treating unit downstream of the membrane separator to the waste heat boiler to receive this water supply filled with concentrated alcohol and other oxygenated hydrocarbons. The additional alcohols and hydrocarbons are then put back into the steam methane reformer and/or bio reforming reactor as both of these reactors have a steam input for the reactions. Additionally, heat recovered from the biomass syngas quench unit is used to heat the waste heat boiler to produce the steam. Also, the Fischer-Tropsch process reactor is highly exothermic and this heat can be used to pre-heat or raise steam from or when sending the dirty water with concentrated alcohols and other hydrocarbons back as dirty steam in the recycle loop to the waste heat boiler.

The HTFT directly converts syngas to a synthetic crude containing gasoline and diesel components. The waxy oil and other light hydrocarbons produced from the HTFT process are recycled or further processed to maximize yield to transportation fuels with some of the lighter components used as fuel in the plant. The HTFT product installation and heavy oil conversion unit is configured to receive heavy oils and wax from the Fischer-Tropsch process and then chemically and/or catalytically hydrocrack them in a reaction into producing additional gasoline, diesel, and jet fuel. In an embodiment, the process may use a UOP CatPoly (Catalytic polymerization technology). The C2-C3 olefins are processed through an oligomerization unit to make additional transportation fuels. The HTFT reactor train will produce additional product including the water-soluble organics discussed above that can be separated and recycled through the process water treating unit into the waste heat boiler and the methane and fuel gas sent into the steam methane reforming reactor. The fuel gas purge includes generated C2-C4 paraffins that are recycled through a recycle loop into the steam methane reforming reactor. Similarly, the methane (CH4) gas from the HTFT reactor train is sent through a recycle loop over to the input of the steam methane reforming reactor. Thus, the methane and C2-C3 hydrocarbons may be recycled to the SMR for hydrogen generation.

High Temperature Fischer-Tropsch Product Refining and Separation

Light olefins and alcohols (C2, C3, and C4) are oligomerized in the Conversion Reactor, Oligomerization, to produce additional diesel and gasoline product. The table below summarizes the reactions included in Oligomerization.

Example Oligomerization Reactions

| | Stoichiometry | n |
|---|---|---|
| (9) | $nC_2H_4 \rightarrow C_{2n}H_{4n}$ | 2-10 |
| (10) | $nC_3H_6 \rightarrow C_{3n}H_{6n}$ | 2-6 |
| (11) | $nC_4H_8 \rightarrow C_{4n}H_{8n}$ | 2-5 |
| (12) | $nC_2H_5OH \rightarrow C_{2n}H_{4n} + nH_2O$ | 2-10 |
| (13) | $nC_3H_7OH \rightarrow C_{3n}H_{6n} + nH_2O$ | 2-6 |
| (14) | $nC_4H_9OH \rightarrow C_{4n}H_{8n} + nH_2O$ | 2-5 |

The high temperature Fischer-Tropsch case also includes a hydrocracker to convert the heaviest hydrocarbon products to additional paraffinic diesel and gasoline components. The hydrocracker may have the reactions shown in the Table. The yields for all of the cracking reactions may range between 95% and 99% of the heavy components.

Example Hydrocracker Reactions

| | Stoichiometry | Carbon Number |
|---|---|---|
| (11) | $C_{2n}H_{4n} + 2H_2 \rightarrow 2C_nH_{(2n+2)}$ | 11-15 |
| (12) | $C_{2n}H_{(4n+2)} + H_2 \rightarrow 2C_nH_{(2n+2)}$ | 11-15 |
| (13) | $C_{(2n+1)}H_{(4n+2)} + 2H_2 \rightarrow C_nH_{(2n+2)} + C_{n+1}H_{(2(n+1)+2)}$ | 11-15 |
| (14) | $C_{(2n+1)}H_{(4n+4)} + H_2 \rightarrow C_nH_{(2n+2)} + C_{n+1}H_{(2(n+1)+2)}$ | 11-15 |

Note, a more rigorous separation of products is typically achievable by distillation. The hydrocracked F-T products can be effectively separated using a distillation column. The distillation column is typically operated to achieve the desired boiling point properties for each of the NGL, LPG, gasoline, jet/kero, and diesel products. A tail gas is also recovered from the distillation column.

Hydrogen Separation and Recovery

FIGS. 4A, 5A, 8, and 11A illustrate example high temperature Fischer-Tropsch processes with a hydrogen separation unit and one or more recycle lines. The hydrogen separation from the high temperature Fischer-Tropsch tail gas may recover 90% recovery of the hydrogen. The recovered hydrogen is recycled directly to the high temperature Fischer-Tropsch fresh syngas feed stream while the low pressure tail gas is consumed as fuel gas in the plant. The Ribblett ratio of the high temperature Fischer-Tropsch fresh feed may be managed by adjusting the amount of H2 recycled from the tail gas back into the compressor or the natural gas feed to the SMR.

Figure 4A:
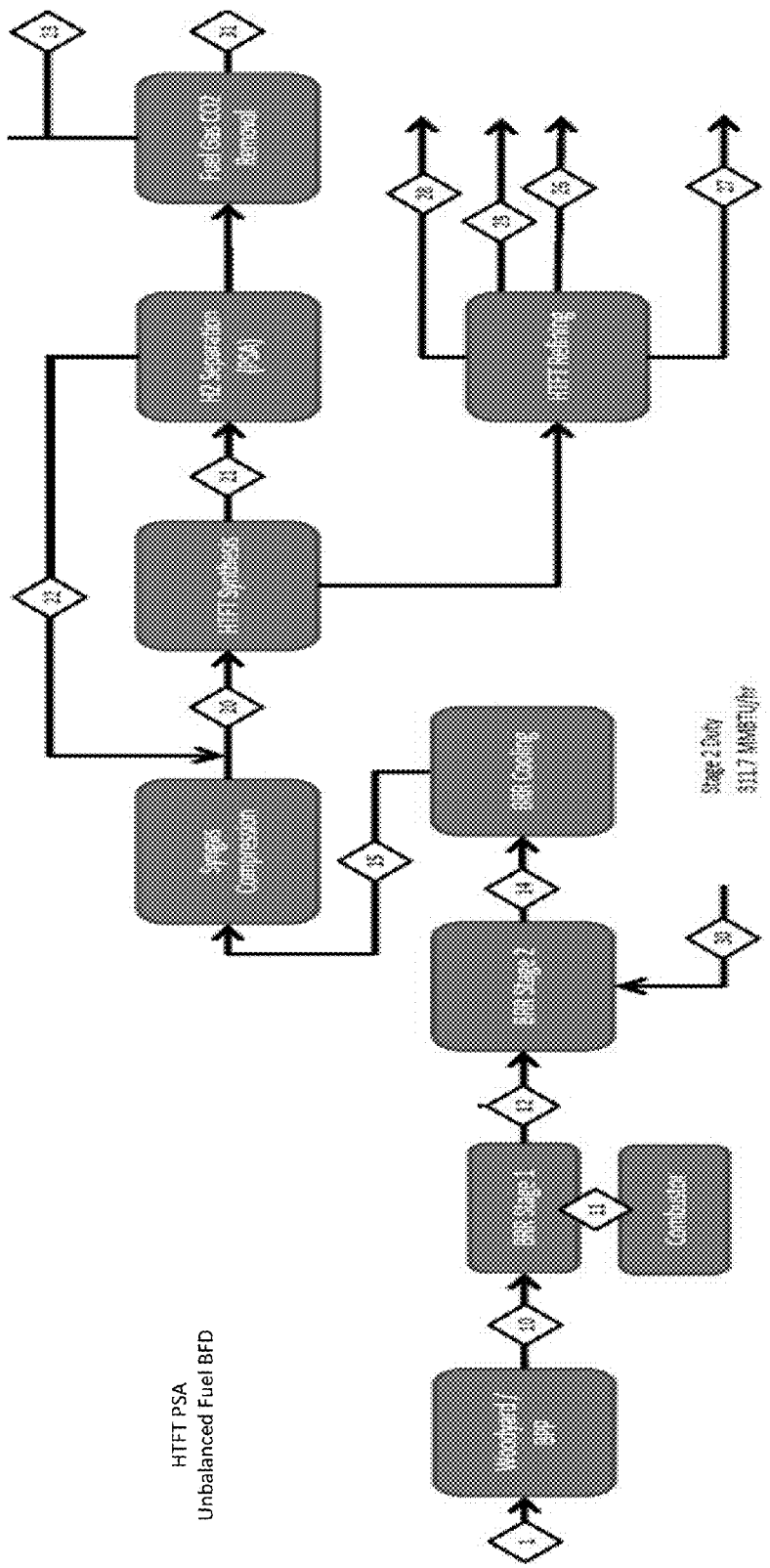
FIG. 4A illustrates a block diagram of an embodiment of the integrated plant with a High Temperature Fischer-Tropsch train, a hydrogen Pressure Swing Absorber separator, and an unbalanced fuel BFD, where all of the tail gas, depleted of H2 by the PSA, is routed as a fuel gas for 1) the combustor in the first stage of the bio reforming reactor, 2) furnaces for plant components including boilers to make steam, and 3) gas fired heaters for the second stage of the bio reforming reactor.

FIG. 4A illustrates a block diagram of an embodiment of the integrated plant with a High Temperature Fischer-Tropsch train, a hydrogen Pressure Swing Absorber separator, and an unbalanced fuel BFD, where all of the tail gas, depleted of H2 by the PSA, is routed as a fuel gas for 1) the combustor in the first stage of the bio reforming reactor, 2) furnaces for plant components including boilers to make steam, and 3) gas fired heaters for the second stage of the bio reforming reactor. The Fischer-Tropsch train is a high temperature Fischer-Tropsch train that has an operating temperature of greater than or equal to 232 degrees C., and combines with the Fischer-Tropsch upgrading and refiner stage to produce a greater amount of gasoline product than diesel fuel product. The high temperature Fischer-Tropsch train has an exit tail gas with a connected recycle loop to recycle by-products including H2 in the tail gas of the high temperature Fischer-Tropsch train back via a pressure swing absorber separator as H2 feedstock into the high temperature Fischer-Tropsch train. The recycle loop also routes the rest of the tail gas as a fuel gas for any of 1) the combustor in the first stage of the bio reforming reactor, 2) furnaces for plant components including boilers to make steam, 3) gas fired heaters for the second stage of the bio reforming reactor, and 4) other similar plant uses. Thus, the rest of the tail gas composition, depleted in H2, from the exit of the Fischer-Tropsch train is routed by the second external recycle loop to be a fuel gas feedstock input into any of a combustor in the first stage of the bio reforming reactor, a heater, or a furnace used in another portion of the integrated plant in order to reduce the non-renewable CO2 emissions from the facility by replacing some of the natural gas used for these furnaces or combustors with this fuel gas, which was derived originally from the biomass fed into the first stage of the bio reforming reactor. In general, the tail gas includes leftover syngas products from Fischer-Tropsch synthesis as well as any product reaction gases generated from the Fischer-Tropsch synthesis process, which are consumed as a fuel when recycled.

The second stage of the bio reforming reactor is in this example a catalytic bio reformer that uses a nickel based catalyst to crack tars at 1700 degrees F. or less in the raw syngas from the first stage to make the chemical grade syngas derived from the steam biomass reforming in this bio reforming reactor. The biomass feed from the biomass feed system into the first stage of the bio reforming reactor may be a powdered form of biomass with, for example, a 10% moisture content. The second stage of the bio reforming reactor may also use a PGM (precious metal) based catalyst to crack tars.

Figure 4B:
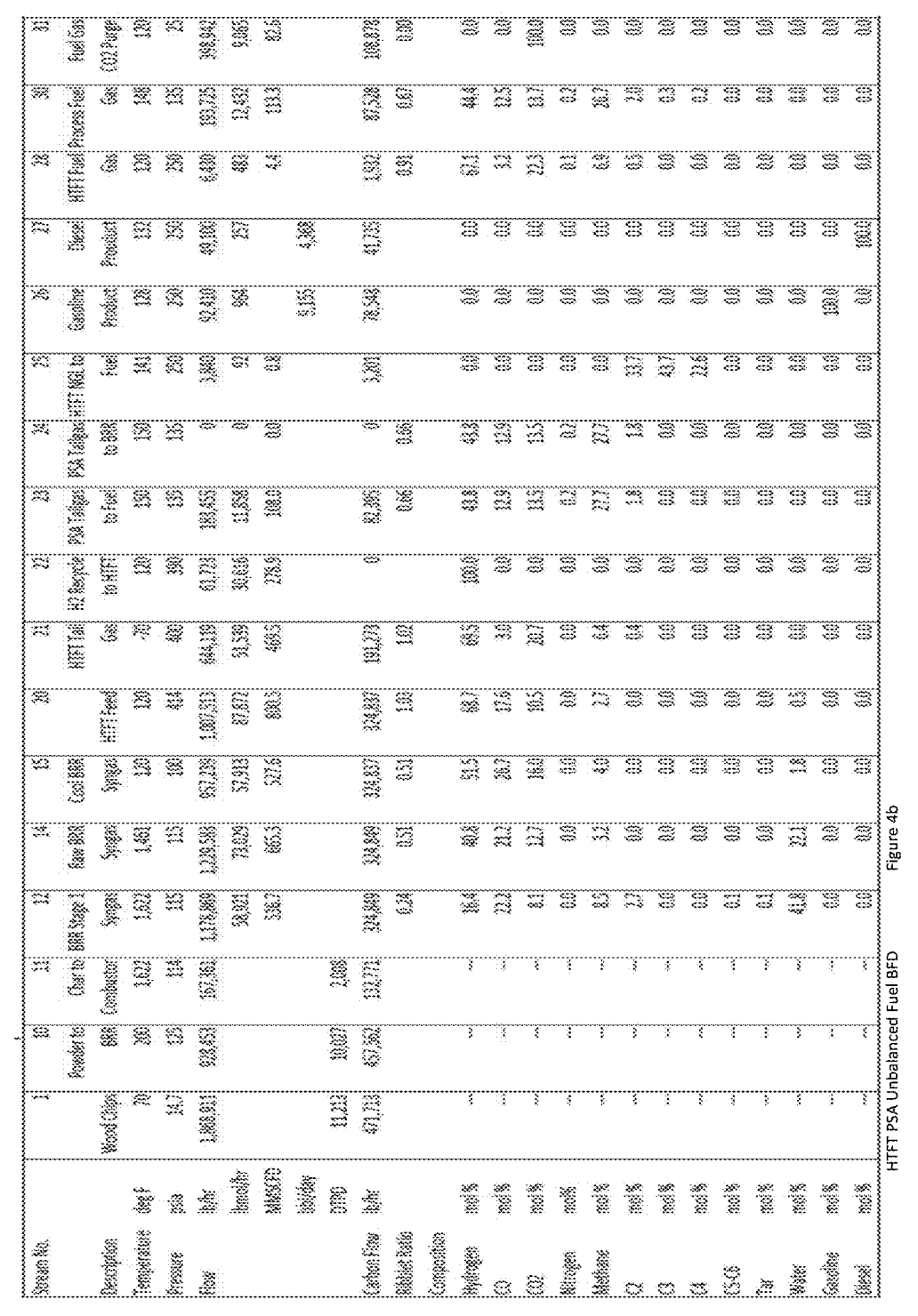

FIG. 4B illustrates a table of example parameters and chemical products of an embodiment of the integrated plant of FIG. 4A.

Figure 5A:
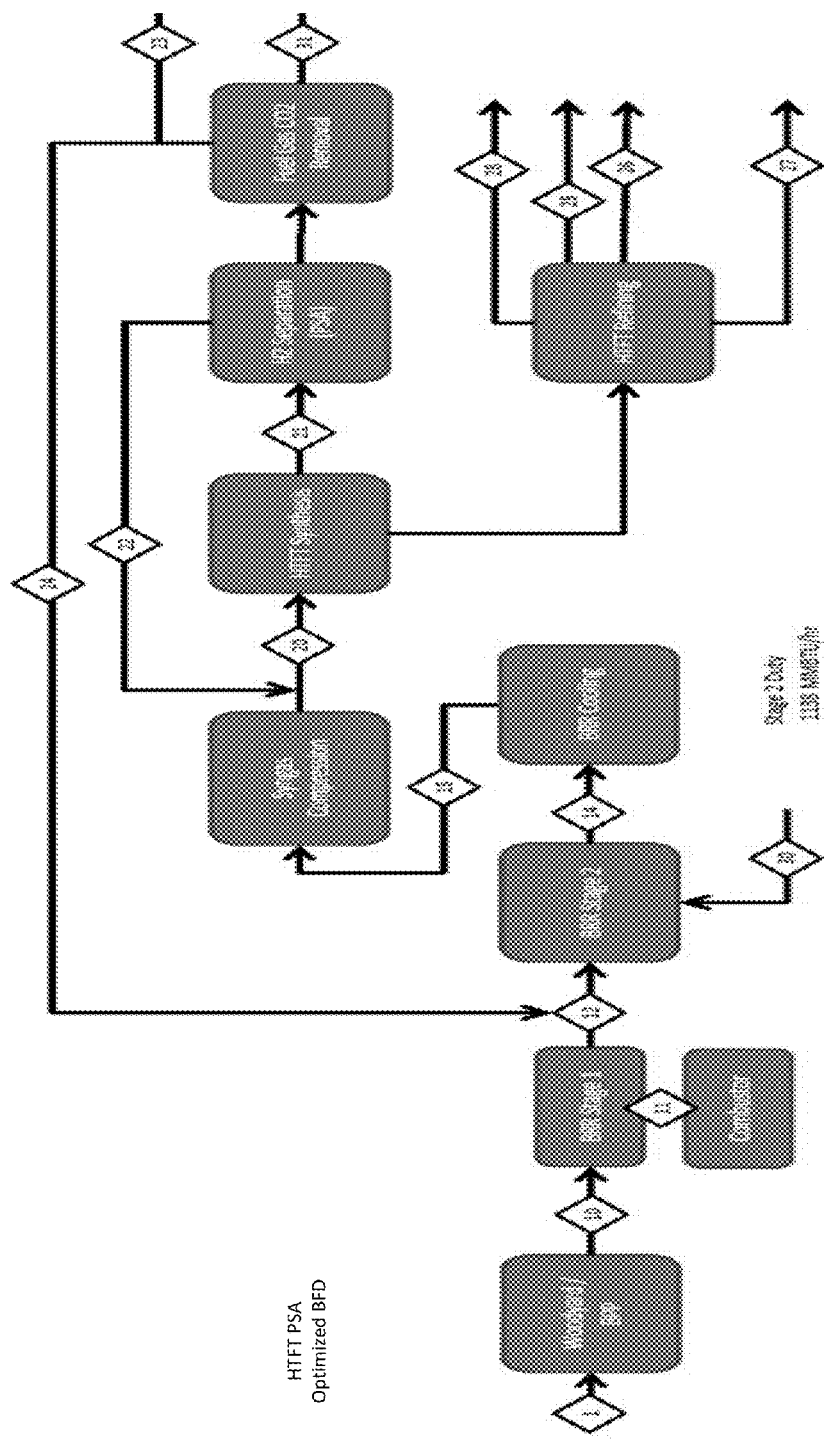
FIG. 5A illustrates a block diagram of an embodiment of the integrated plant with a High Temperature Fischer-Tropsch train, a hydrogen Pressure Swing Absorber separator, and an Optimized BFD, where the tail gas from the Fischer-Tropsch train, depleted of H2 from the PSA, is routed to be split i) as a fuel gas for 1) the combustor in the first stage of the bio reforming reactor, 2) furnaces for plant components including boilers to make steam, and 3) gas fired heaters for the second stage of the bio reforming reactor and ii) as part chemical feedstock for the second stage of the bio reforming reactor.

FIG. 5A illustrates a block diagram of an embodiment of the integrated plant with a High Temperature Fischer-Tropsch train, a hydrogen Pressure Swing Absorber separator, and an Optimized BFD, where the tail gas from the Fischer-Tropsch train, depleted of H2 from the PSA, is routed to be split i) as a fuel gas for 1) the combustor in the first stage of the bio reforming reactor, 2) furnaces for plant components including boilers to make steam, and 3) gas fired heaters for the second stage of the bio reforming reactor and ii) as part chemical feedstock for the second stage of the bio reforming reactor. A first H2 external recycle loop connects to the Fischer-Tropsch train. The high temperature Fischer-Tropsch train has an exit tail gas in which a H2 separator, which is selected from any of i) a pressure swing absorber separator, ii) a temperature swing absorber separator, iii) a hydrogen separation membrane, or iv) a combination of the three, is used to molecularly separate H2 from the exit tail gas in order to recycle the H2 recovered back into a syngas compression stage to be co-fed with the chemical grade syngas from the second stage of the bio reforming reactor into the input of the high temperature Fischer-Tropsch train. The H2 external recycle loop connects to the Fischer-Tropsch train to enhance the yield of any of the selected fuel products of gasoline, jet fuel, and diesel fuel, coming out of a refining stage. A splitter external recycle loop connects to the Fischer-Tropsch train through the H2 separator and Fuel Gas CO2 removal unit to recoup the rest of the tail gas composition. The splitter external recycle loop i) splits the remainder of the tail gas as i) a fuel gas for 1) a combustor in the first stage of the bio reforming reactor, 2) furnaces for plant components including boilers to make steam, and 3) gas fired heaters for the second stage of the bio reforming reactor as well as ii) splits the remainder of the tail gas as part of a chemical feedstock for the second stage of the bio reforming reactor.

The biomass feed from the biomass feed system into the first stage of the bio reforming reactor may be a powdered form of biomass with for example a 10% moisture content. The second stage of the bio reforming reactor may be a catalytic reactor. The PSA tail gas is split between i) recycled as fuel gas and ii) recycled as chemical feedstock into the second stage of the bio reforming reactor.

Figure 5B:
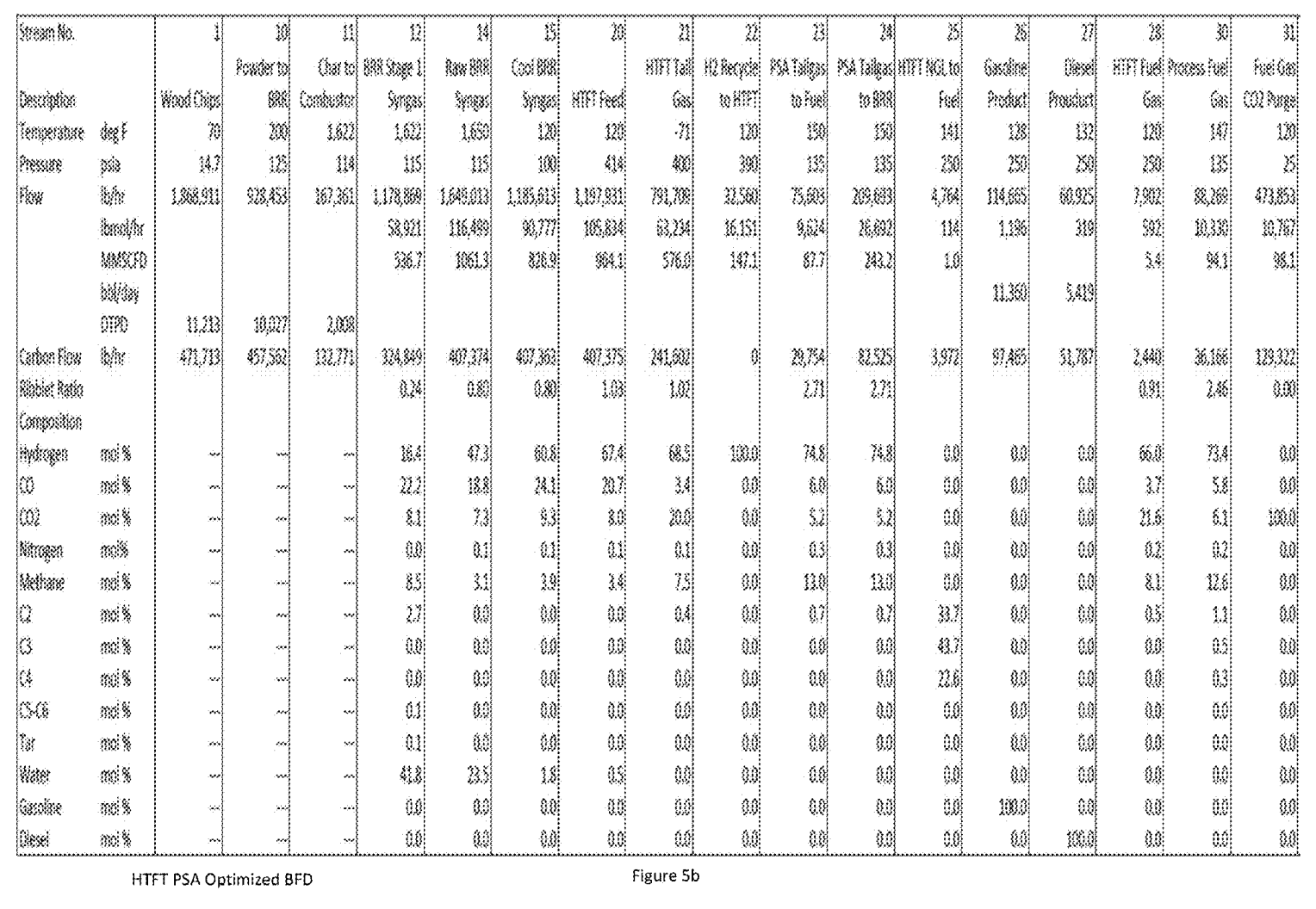

FIG. 5B illustrates a table of example parameters and chemical products of an embodiment of the integrated plant of FIG. 5A.

FIG. 8 illustrates a block diagram of an embodiment of the integrated plant with a Fischer-Tropsch train and a wood yard feed system supplying wood biomass chips to both the first stage of the bio reforming reactor and the fuel gas production unit. The second stage of the bio reforming reactor may be a thermal reactor that cracks the tars with elevated temperatures and does not need the aid of a catalyst.

FIGS. 4A, 5A, 8, and 11A illustrate example H2 separators in the recycle loops, where all or just a portion of the Fischer-Tropsch tail gas is sent to the hydrogen separation unit. The hydrogen recovered from the tail gas is returned directly to the fresh feed syngas to the Fischer-Tropsch unit. The rejected gas from the hydrogen separation unit is burned as fuel gas by other components in the plant to offset fuel gas consumption. In an embodiment, the fraction of Fischer-Tropsch tail gas routed to the hydrogen separation can be just enough so that the production of fuel gas from biomass could be eliminated from the process. In an example, an optimized flow for High Temperature Fischer Tropsch is accomplished by recovering hydrogen from the high temperature Fischer-Tropsch tail gas and combining that hydrogen back into the high temperature Fischer-Tropsch fresh feed gas. This will reduce the required capacity of the steam-methane reformer by: 1) reducing the volume of hydrogen flow through the SMR; and 2) increasing the steam-methane reformer performance by shifting the methane reforming equilibrium towards higher methane and steam conversion. A reduction in steam-methane reformer performance can be attributed to the relatively high hydrogen content of the recycled high temperature Fischer-Tropsch tail gas. Since hydrogen is a product of the steam-methane reformer reaction, its presence in the feed to the steam-methane reformer restricts the conversion of methane due the thermodynamic equilibrium of the methane reforming reaction. Instead, hydrogen is removed from a portion of the high temperature Fischer-Tropsch tail gas and returned to the fresh syngas feed to the high temperature Fischer-Tropsch unit, which increases the amount of moles of H2 available to mix with the syngas derived from biomass. The rest of the tail gas coming out from the hydrogen separation unit is used for fuel gas in the plant. The untreated portion of the high temperature Fischer-Tropsch tail gas is recycled to the input of the steam-methane reformer.

The hydrogen separation unit can be a pressure swing absorber (PSA) that recovers the hydrogen at a higher pressure than the rejected gas. In the high temperature Fischer-Tropsch PSA case, the hydrogen recovered from the high temperature Fischer-Tropsch tail gas is returned to the fresh syngas feed, thereby increasing the hydrogen concentration in the H2 to CO ratio in the syngas feed into the input of the Fischer Tropsch train. This means that a higher proportion of the syngas being fed to the high temperature Fischer-Tropsch unit can be derived from biomass, which can be seen by the higher renewable content of the products in the PSA case (67%) than the base cases (58% in FIG. 5A). Since more biomass is used as feed to the process, natural gas can be used to meet the plant fuel demand while still meeting non-renewable greenhouse gas (GHG) emissions target for the overall process. This reduces the amount of biomass that is consumed to inefficiently generate biomass-derived fuel gas. Finally, removing some of the excess hydrogen from the feed to the steam-methane reformer both increases the hydrogen efficiency and reduces the fuel demand of the SMR.

The CO2 is removed from the hydrogen PSA reject gas before the gas is used as fuel in the plant.

FIG. 1A illustrates a block diagram of an embodiment of the integrated plant with a Low Temperature Fischer-Tropsch train and recycle loops that recycle products back to either the steam-methane reformer or the second stage of the bio reforming reactor. The Fischer-Tropsch train is a low temperature Fischer-Tropsch train that has an operating temperature of less than or equal to 230 degrees C., and combines with the low temp Fischer-Tropsch upgrading and refiner stage to produce a greater amount of diesel fuel product than gasoline product. The low temperature Fischer-Tropsch train may use a cobalt based catalyst for the Fischer-Tropsch synthesis. The Fischer-Tropsch train also connects to an alcohol recovery stage to remove soluble alcohols including methanol, propanol, and ethanol from the water stream produced in the Fischer-Tropsch synthesization process. The alcohol recovery stage potentially uses one or more distillation columns to recover the alcohols into the produced diesel fuel product and gasoline product coming out the Fischer-Tropsch upgrading and refiner stage. Note, commercial grade product fuels of gasoline and diesel can include up to ten percent alcohol. The refiner stage may convert the raw Fischer-Tropsch syncrude into finished products and recycle streams.

Again, the chemical grade syngas of the bio reforming reactor and chemical reaction products of the steam methane reformer are combined to achieve a proper H2 to Carbon Monoxide (CO) ratio between 1.5 to 2.4 for the Fischer-Tropsch synthesis, with the cobalt (Co) catalyst, and does not include a water gas shift stage to adjust the H2 to CO ratio. Two or more control systems monitor a chemical composition feedback signal of a first stream of chemical grade syngas from the bio reforming reactor and a second stream of chemical reaction products from the steam methane reformer with two or more sensors to produce the proper amount of H2 to CO ratio.

Figure 1B:
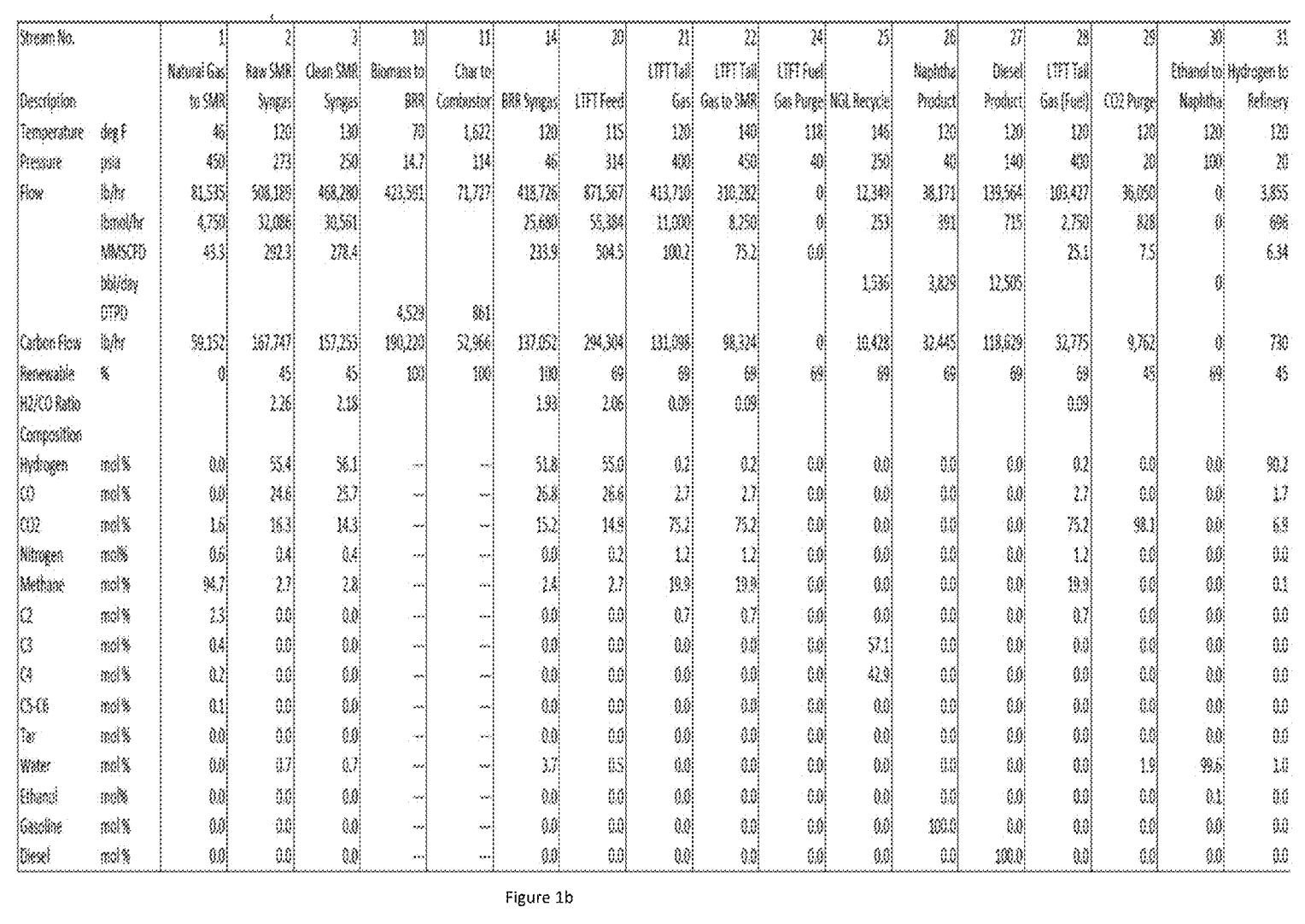

FIG. 1B illustrates a table of example parameters and chemical products of an embodiment of the integrated plant of FIG. 1A.

The integrated plant may have a Low Temperature Fischer-Tropsch train, a water treatment unit, and condensate and wax that is sent to a refinery unit.

The integrated plant may also have a Low Temperature Fischer-Tropsch train, a water treatment unit, a hydrocracker, and an upgrade unit. One or more distillation columns separate the Fischer-Tropsch product streams and the upgrade stage applies one or more processes, including a possible hydrocracking, to one or more of the Fischer-Tropsch product streams in order to any of remove oxygenates from the reaction product components, saturate olefins in the reaction product components, ensure an octane rating for a commercial gasoline product is, for example, at least 87, and ensure a cetane rating for a commercial diesel fuel product is, for example, at least 40. The upgrade stage may also apply one or more treatments to adjust a molecular weight of the gasoline product and the diesel fuel product to achieve a desired boiling point range of the diesel product is or equal to or greater than 180 degrees C. and the gasoline product is or equal to or greater than 100 degrees C.

The Fischer-Tropsch train combines with a refining stage to separate and upgrade the components in a product stream of the Fischer-Tropsch train in order to send the components to two or more product liquid fuel stages including a gasoline stage, diesel fuel stage, natural gas in liquid form (NGL) stage, and fuel gas stage. One or more recycle loops recycle product liquid fuels including the natural gas in liquid form (NGL) and oxygenates back to a steam-methane reformer as chemical feedstock for the steam-methane reformer in order to enhance the yield of the selected fuel products of gasoline, potentially jet fuel, and diesel fuel coming out of the refining stage.

Note, the tail gas recycled as fuel gas includes H2 and other combustible gases, which are sent back to the steam-methane reformer or the second stage of the bio reforming reactor as chemical feedstock for the reactions that occur in those reactors.

The integrated plant with a Low Temperature Fischer-Tropsch train combines a conventional syngas from the steam methane reformer (SMR) with chemical grade syngas produced from the steam biomass reforming. The steam-methane reformer essentially provides hydrogen to correct the composition of the relatively hydrogen-poor biomass-derived syngas such that the combined stream is suitable for chemical synthesis in a Fischer Tropsch train. In an example, the chemical grade syngas produced from the steam biomass reforming produced out of the second stage has a H2/CO ratio as low as 1.5. The reason is that the H2:CO ratio of the chemical grade syngas is H2 lean and that is why the plant needs the synergy combination with the SMR's syngas from natural gas to supplement the shortage of hydrogen.

The bio reforming reactor produces a bio syngas H2:CO ratio that can be between 1.5 to 2.1. When the plant recycles some purge gases from the Fischer-Tropsch synthesis process back to the second stage of the bio reforming reactor, then the overall bio syngas composition should affect the balance.

In the case of the low temperature Fischer-Tropsch train, with no CO2 selectivity and no WGS activity of a Cobalt (Co)-catalyst, the equilibrium performance control parameter may be the H2:CO ratio.

H2/CO Ratio

On a molar basis, the bio reforming reactor syngas can have a H2/CO ratio as high as 1.9. Thus, only a very small amount of hydrogen from natural gas from the steam-methane reformer will be needed to provide the proper syngas ratio. The control system for the plant can still use excess hydrogen from the steam-methane reformer to shift CO2 to CO and reduce the biomass feed rate into the bio reforming reactor.

FIG. 3 illustrates a table of example parameters for the integrated plant using biomass derived syngas compared to standard HTFT and LTFT parameters.

CO2 Concentration

A preferred feed gas has a CO2/CO ratio of only 0.2. The CO2/CO ratio in both the steam-methane reformer syngas and the bio reforming reactor syngas can be too high. Therefore, the plant purges CO2 from both syngas sources to meet the low CO2 ratio in the mixed syngas feed to the LTFT reactor. The plant may deal with it by recycling the CO2 through the steam-methane reformer and converting some of it to CO with the excess hydrogen in the reformer.

CO2 Reactivity

Typically, the cobalt LTFT catalyst is not active for a Water Gas Shift reaction. The plant may have a very inhibited WGS and manage the CO2 inlet concentration by purging and shifting with hydrogen from the steam-methane reformer in an external step.

The plant can manage the above H2 conversion, the CO conversion and the methane selectivity through the external recycle loop back to the SMR. The plant may require additional fuel to the SMR. The example conversion is reporting significantly better conversion to gasoline-range naphtha which will be beneficial when the naphtha can be upgraded to a saleable product via the upgrade unit. Note, the diesel-range product is reduced in the example results, which may be shifted by the control system, especially if the process to upgrade the naphtha is not cost effective. The example results have lower waxes, which should reduce the size and/or complexity of the upgrading unit. Lastly, the example results report significantly higher alcohol and oxygenates. The recovery unit may recover those dilute oxygenates from a large stream of water. The liquid yield per mass of converted syngas (H2+CO) looks to be similar to the high temperature Fischer-Tropsch case. The downside is the lower conversion of H2 and CO in the example results. That means less liquid product yield per mass of supplied syngas. As mentioned above, the external recycle loop may help mitigate that effect, but it will be at a higher fuel cost.

The plant may take just the wax created in the FT synthesis and apply a hydrocracker to process the wax all the way to distillate product. The diesel fuel product is fed to a hydrocracker to meet commercial quality diesel fuel specifications.

As discussed, applying a LTFT solution for a Biofuels Project with fresh syngas feed to the LTFT synthesis gas island ends with the production of wax and condensate as the two primary products, and a refinery solution to meet the gasoline market needs. A water treatment unit design specifically developed and designed for LTFT water is used to recover alcohols. The upgrade unit makes use of the recover alcohols from the waste water treatment.

In an embodiment, the plant has a hydrocracker for distillate production. The plant in this embodiment also starts with the fresh syngas feed to the LTFT synthesis gas island and ends with distillate fuel after the CLG section and the primary condensate product as a separate stream. The only additional information attributable to this case variation is the stream data of the diesel and any possible residual naphthas resulting from the hydrocracking of the waxes.

The plant operation by the control system can be designed to minimize the emissions of greenhouse gases and maximize renewable (bio) carbon in the products in geographic locations and business environments that provide monetary incentives for doing so.

Figure 2:
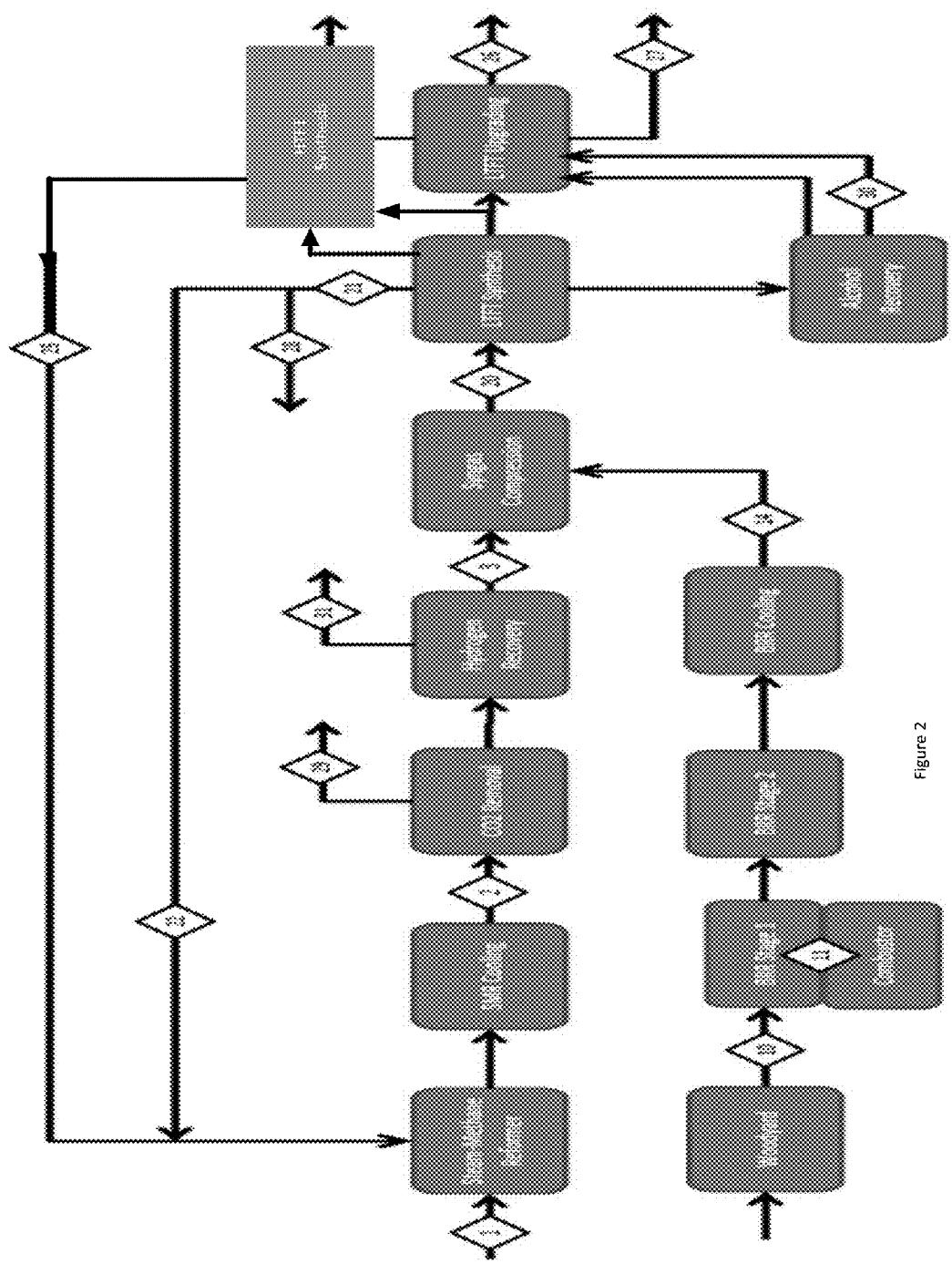
FIG. 2 illustrates a block diagram of an embodiment of the integrated plant with a Low Temperature Fischer-Tropsch train that produces diesel and sends exit tail gas and potentially other reactant products to be utilized as feedstock in a high temperature Fischer-Tropsch train and then the remaining tail gas can recycled back into the plant.

FIG. 2 illustrates a block diagram of an embodiment of the integrated plant with a Low Temperature Fischer-Tropsch train that produces at least diesel and then sends exit tail gas and potentially other reactant products to be utilized as feedstock in a high temperature Fischer-Tropsch train and then the remaining tail gas can recycled back into the plant. The LTFT train may supply the HTFT with its tail gas versus recycling that gas. The LTFT train may also supply the HTFT with other reaction products and allow the HTFT process further enhance these products. The HTFT reactor then may recycle tail gas for use in the SMR, the second stage of the bio reforming reactor, to the hydrogen separator, and any combination.

In an example, the plant fuel gas demand is met by a combination of natural gas and fuel gas produced from biomass. (for example see FIG. 6A) The ratio of biomass generated gas, recycled fuel gases, and natural gas fuel gas is adjusted to maintain a greenhouse gas emissions reduction of 15% as compared to conventional gasoline. Increasing the PSA recycle fraction reduces the amount of natural gas feed to the SMR, which allows more natural gas to be burned as fuel gas. Conversely, the biomass that was being used to produce fuel gas can instead be fed to the steam biomass reforming process.

FIG. 7A illustrates a block diagram of an embodiment of the integrated plant with a High Temperature Fischer-Tropsch train, a hydrogen Pressure Swing Absorber separator, and recycle loops that recycle product liquid fuels including natural gas in liquid form (NGL) and oxygenates back to the steam-methane reformer. The Fischer-Tropsch train couples to a refining stage that includes one or more distillation columns. The high temperature or low temperature Fischer-Tropsch train has an exit tail gas section as well as a Fischer-Tropsch product stream sent to the refining stage to separate and upgrade chemical components in the Fischer-Tropsch product stream. The refining stage sends the chemical components of the Fischer-Tropsch product stream to two or more product liquid fuel stages including a gasoline liquid fuel stage, a diesel fuel liquid fuel stage, a jet fuel stage, a natural gas in liquid form (NGL) liquid fuel stage, and a fuel gas stage. The integrated plant further includes one or more recycle loops that recycle some of the product liquid fuels including the natural gas in liquid form and oxygenates back to an input port of a steam-methane reformer as chemical feedstock for the steam-methane reformer to enhance the yield of any of the selected fuel products of gasoline, jet fuel, and diesel fuel coming out of the refining stage. One or more recycle loops also recycle fuel gas back into the integrated plant to supply fuel for any of i) a combustor in the first stage of the bio reforming reactor, ii) a heater for a steam boiler iii) a gas fired heater for the second stage of the bio reformer reactor, or iv) a furnace used in another portion of the integrated plant. Thus, the integrated plant ends up merely producing the selected fuel products of gasoline, diesel fuel, and potentially jet fuel, to enhance the yield of selected fuel products. The product fuels of the gasoline, the diesel fuel, the jet fuel, or some combination of these three, are all derived in part from the biomass feed in the first stage of the bio reforming reactor. A remainder of the generated fuel products from the Fischer-Tropsch product stream, each have a recycle loop to be consumed and utilized elsewhere in the integrated plant.

In FIG. 7A for example, the tail gas from the high temperature Fischer-Tropsch synthesis unit is also recycled to the steam-methane reformer (SMR) to more effectively utilize the carbon feedstock to the plant. The methane produced in the high temperature Fischer-Tropsch process is reformed back to syngas in the steam-methane reformer and returned as fresh syngas feed to the high temperature Fischer-Tropsch unit. The integrated plant may recycle a smaller volume of high temperature Fischer-Tropsch tail gas "as-is", (i.e. without passing that tail gas through the H2 separator and the CO2 removal stage) to the steam-methane reformer to increase the methane and water conversion in the steam-methane reformer while reducing the steam-methane reformer size and fuel demand. In an embodiment, the plant fuel gas demand for various heating devices in the plant may be completely met by natural gas and then the biomass fuel gas production unit can be eliminated from the integrated plant. (for example see FIG. 1A) A number of factors contribute to this fuel balance including: a smaller natural gas feed rate to the SMR, less tail gas reforming in the SMR, and more PSA tail gas that is directed to fuel. Natural gas and fuel gas produced from biomass are used to balance the fuel gas supply with the fuel gas demand on a gross heating value (not flow rate) basis while maintaining the targeted 15% reduction in greenhouse gas emissions.

In an embodiment, (for example see FIG. 7A) the plant is operated such that the fuel value in the Fischer-Tropsch tail gas exceeds the fuel demand for the plant. Operating in this range makes sense when additional equipment is provided to recycle PSA tail gas back to the SMR.

FIG. 7B illustrates a table of example parameters and chemical products of an embodiment of the integrated plant of FIG. 7A.

Figure 11A:
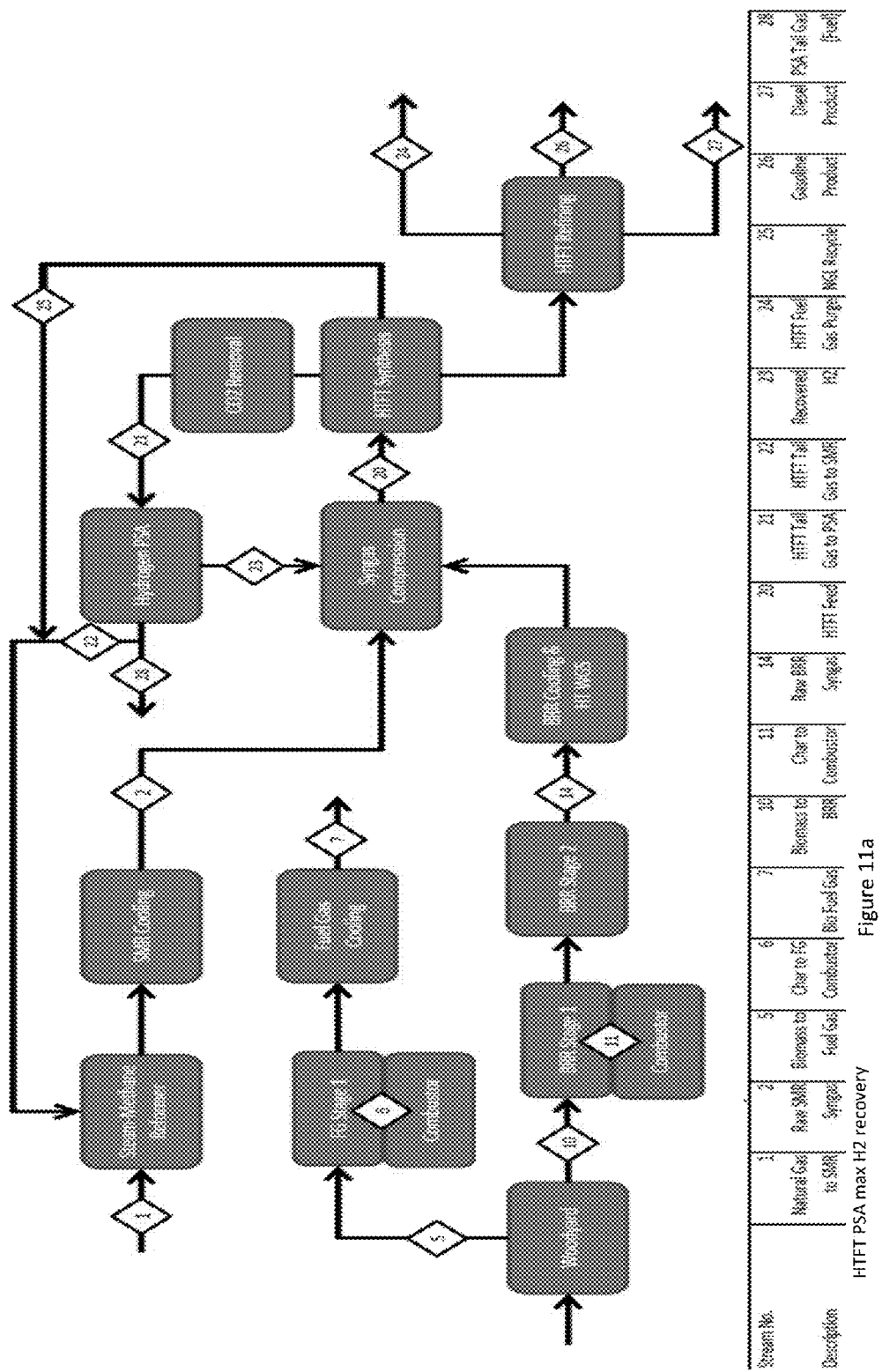
FIG. 11A illustrates a block diagram of an embodiment of the integrated plant where the tail gas from the Fischer-Tropsch train is passed through a CO2 removal unit and then through a hydrogen recovery PSA unit.
Figure 11B:
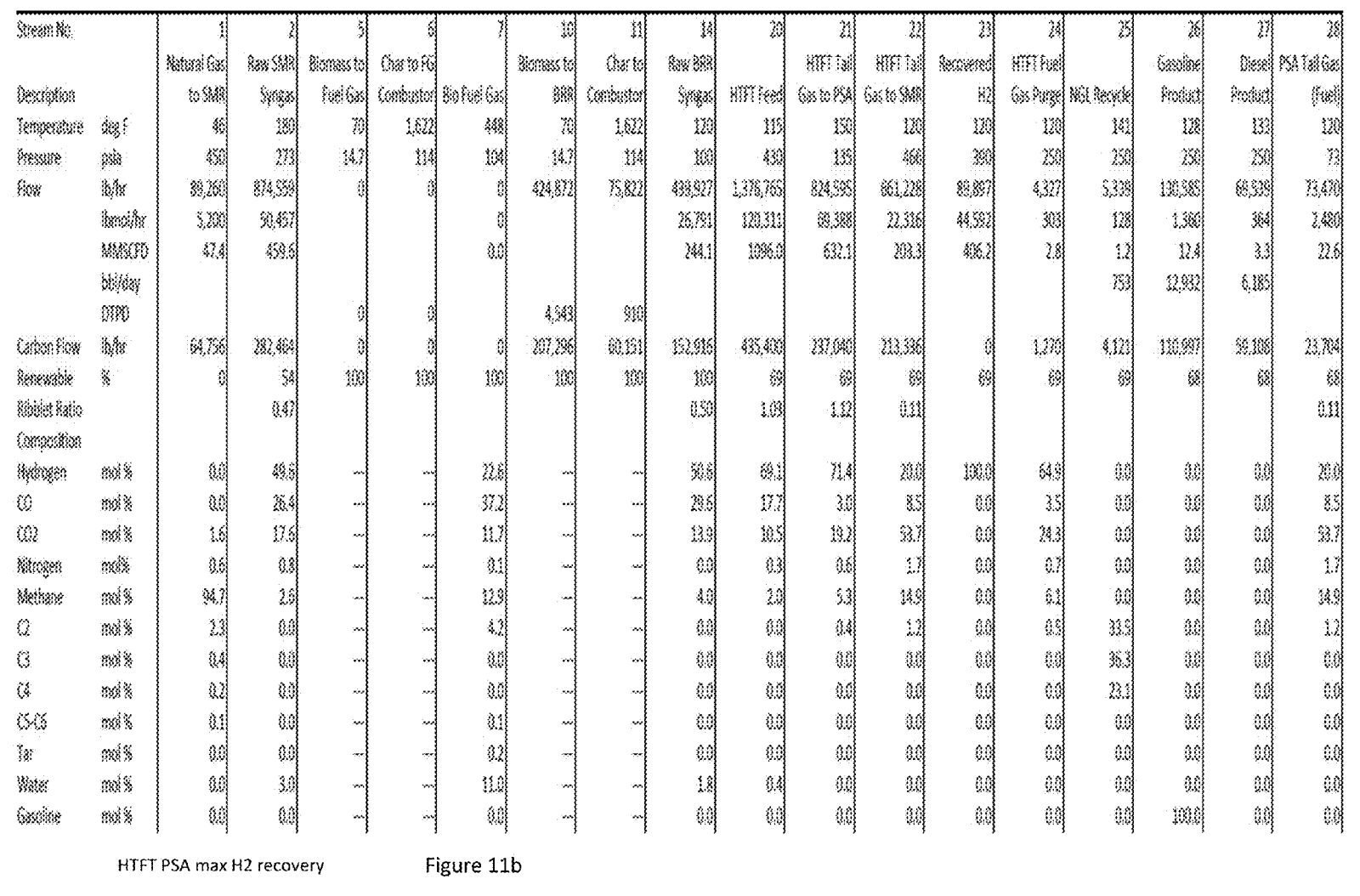

FIG. 11A illustrates a block diagram of an embodiment of the integrated plant where the tail gas from the Fischer-Tropsch train is passed through a CO2 removal unit and then through a hydrogen recovery PSA unit. An external recycle loop connects to the Fischer-Tropsch train. The high temperature or low temperature Fischer-Tropsch train has an exit tail gas in which a H2 separator, any of i) a pressure swing absorber separator, ii) a temperature swing absorber separator, iii) a hydrogen separation membrane, or iv) a combination of the three, is used to molecularly separate H2 from the exit tail gas. In this example, the H2 separator is a pressure swing absorber separator. The H2 separator recycles the H2 recovered back into a syngas compression stage to be co-fed with the chemical grade syngas from the second stage of the bio reforming reactor into the input of the high temperature or low temperature Fischer-Tropsch train to enhance the yield of selected fuel products, any of gasoline, jet fuel, and diesel fuel, coming out of a refining stage. A second recycle loop routes a rest of the tail gas composition, depleted in H2, from the exit of the Fischer-Tropsch train, to be a fuel gas feedstock input into any of i) a combustor in the first stage of the bio reforming reactor, ii) a heater for a steam boiler or gas fired heater for the second stage of the bio reformer reactor, or iii) a furnace used in another portion of the integrated plant. The use of recycled tail gas as fuel gas reduces the non-renewable CO2 emissions from the facility by replacing some of the natural gas used for heat these furnaces or combustors with this fuel gas, derived originally from the biomass fed into the first stage of the bio reforming reactor. Again, a composition of the tail gas includes leftover syngas products from Fischer-Tropsch synthesis as well as any product reaction gases from the Fischer-Tropsch synthesis process, which are consumed as a fuel when recycled. The plant may be operated to maximize the H2 recovered by the pressure swing absorber separator.

A CO2 removal stage, is in line with the H2 separator in the external recycle loop connected to the Fischer-Tropsch train. The CO2 removal stage has CO2 absorber columns with material, including but not limited to sodium hydroxide, potassium hydroxide, amine, lithium hydroxide, or activated carbon, in order to deplete an amount of CO2 in the recycled tail gas to be lower than a fixed amount of less than 500 parts per million CO2.

In this optimized high temperature Fischer-Tropsch flow, the tail gas from the high temperature Fischer-Tropsch unit is passed through a CO2 removal unit and then through a hydrogen recovery PSA unit. Only a small portion (<10%) of the CO2 in the tail gas is removed in the CO2 removal unit in order to balance the Ribblett ratio in the fresh feed. The recovered hydrogen is added back to the high temperature Fischer-Tropsch feed syngas to help manage the Ribblett ratio. The hydrogen recovered in the PSA (90% of the hydrogen in the inlet stream) is recycled directly back to the fresh feed stream via the syngas compressor train. The rejected gas from the PSA unit is split with an arbitrary 10% of that stream being directed to be fuel gas while the remainder is recompressed and recycled as feed to the SMR. This flow of integrated plant maximizes the hydrogen recovery from the high temperature Fischer-Tropsch tail gas, which minimizes the carbon that has to be rejected from the process. This process has the highest carbon efficiency because it produces the most product from the least amount of feedstock. This case also improves the operation of the steam-methane reformer by minimizing the amount of hydrogen that enters as feed to the SMR. In an embodiment, the integrated plant flow and recycle loops meets the 15% greenhouse gas reduction target with a fuel-balanced plant, i.e., the plants has no biomass fuel gas production unit. (see for example FIGS. 1A, 4A and 5A) The performance of this process will likely be sensitive to both the overall plant fuel demand and the overall demand for hydrogen in either the high temperature Fischer-Tropsch catalyst reduction step or in the product refining area. Qualitatively, if either the plant fuel gas demand or the total hydrogen demand increases, the carbon efficiency of the process will decrease.

In an embodiment, the recycle loop in the plant splits the high temperature Fischer-Tropsch tail gas ahead of the CO2 removal unit. A small purge stream will be sent through the CO2 removal unit and cleaned up for use as fuel gas. The bulk of the tail gas will go through the PSA for hydrogen recovery and then be recompressed as feed to the SMR. The size of the purge stream will probably be dictated by the balance between the greenhouse gas reduction target and the Ribblett ratio of the syngas. The advantage of this configuration is reduced size for the PSA unit, no compression costs for the purge stream that is sent to fuel gas, and a higher quality fuel gas which will improve the fired heater fuel efficiency. The disadvantage is that some hydrogen will be lost to the purge stream as fuel gas rather than being recovered back into the process.

High Temperature Fischer-Tropsch Synthesis and Refining Blocks

The high temperature Fischer-Tropsch hydrocarbon product can sometimes be approximated as a mixture of linear paraffins and olefins. Note, the product fuels generated do vary from linear paraffins and olefins, especially for fuel specifications such as octane number, however the isomers all have the same chemical formula so an example material balance calculation would still be valid. The high temperature Fischer-Tropsch catalyst can be iron-based; and therefore, catalytically active for WGS which results in significant conversion of CO to CO2. The CO conversion in the high temperature Fischer-Tropsch reactor is 90% to all products including CO2 and CH4. Ninety-six percent of the C2, C3 and C4 olefins and alcohols are converted to gasoline and diesel components in the oligomerization unit.

High-boiling point (>350° C.) high temperature Fischer-Tropsch products can be hydrocracked to diesel range product. The high temperature Fischer-Tropsch process will be long on steam production; therefore, there will be no fuel gas demand for an auxiliary boiler. The refining block may convert Olefins to Distillate products via converting low molecular weight olefins to higher molecular weight gasoline and diesel range components. Note, the high temperature Fischer-Tropsch process requires a higher ratio of biomass-derived fuel to natural gas due to the lower product volume.

Duel Use Stage 2 Portion of the Bio Reforming Reactor

In an embodiment, the second stage of the bio reforming reactor is a gas-fired externally heated thermal cracking reactor doing steam reforming on the CH4, tars, chars and other components in the raw syngas mixture received from the first stage of the bio reforming reactor. Thus, the second stage is a bioreformer handling bio-tars and bio-methane/light hydrocarbons being steam reformed into their corresponding syngas molecules. The second stage is also fed natural gas as a feed stock into this second stage in a proportion required to get the H2-CO ratio correct for Fischer-Tropsch synthesis with a little extra H2 content to produce the H2 the integrated plant needs for upgrading section at the back end of the plant (either hydrotreating for Methane To Gasoline or refiner processes for upgrade the Fischer-Tropsch products). The thermal cracking reactor in the second stage is made bigger for the higher duty. Recycle loops in the plant with CO2 removal units pull out CO2 from this stream and the Fischer-Tropsch tail gas section that is required for the lock hoppers in the biomass feed system. The integrated plant with the duel use second stage portion of the bio reforming reactor eliminates the entire steam methane reformer section of the plant, which is typically in parallel with the bio reforming reactor, which saves a lot of construction costs in both eliminating the steam methane reformer equipment itself as well as reducing a lot of piping. The duel use second stage portion of the bio reforming reactor also simplifies the control systems control of the plant with one less complex system. The duel use second stage portion of the bio reforming reactor allows starting the integrated plant up on natural gas feedstock just as planned before then begin feathering in raw bio syngas for the first stage of the bio reforming reactor gradually as the plant brings on capacity.

The integrated plant for the high temperature Fischer-Tropsch cases incorporates both optimum product yields and refining processes as well as unbalanced operations. Some integrated plant flows require bio-fuel gas production, while the optimized high temperature Fischer-Tropsch case has been designed to eliminate the need for a separate bio-fuel gas production unit. Note, an optimized high temperature Fischer-Tropsch production volume is equal to a similar MTG base case with about 5% less biomass and natural gas feed to the plant at the same level of greenhouse gas emissions reduction. The optimized high temperature Fischer-Tropsch process also results in products with a higher fraction of renewable carbon which are more valuable in a RIN-influenced fuels market.

Typically, the high temperature Fischer-Tropsch process can be constructed and operated to be self-sufficient in power production which will reduce both the greenhouse gas emissions and the direct material costs.

The control systems may cooperate with a set of diverter valves to control an amount of reactant gas being i) recycled back into the steam methane reformer, ii) recycled back into the bio reforming reactor, and iii) diverted into the input of the Fischer-Tropsch synthesis train to make a consistent flow of syngas at the proper H2 to CO ratio into the Fischer-Tropsch synthesis train.

The control systems may also cooperate with the one or more biomass feedstock supply lines of a biomass feed system to control an amount of biomass material going into the first stage to control an amount of chemical grade syngas coming out of the bio reforming reactor. The two or more control systems may also cooperate to control an amount of natural gas feed into the steam methane reformer to control an amount of chemical reaction products coming out of the SMR. In general, the steam methane reformer provides any of 1) hydrogen gas, 2) a hydrogen-rich syngas composition, in which a ratio of hydrogen-to-carbon monoxide is higher than a ratio generally needed for Fischer-Tropsch synthesis train, and 3) any combination of the two, to be mixed with a potentially carbon-monoxide-rich syngas composition from the bio reformer reactor.

The control systems may include a bio reforming reactor control system and a steam methane reformer control system. The control systems may interact to alter a flow of the biomass particles through the bio reformer reactor much more gradually than an altering of a flow of the methane-based gas through the steam methane reformer reactor. Thus, the steam methane reformer control system may be configured to throttle a flow of the methane-based gas and steam as reactants in the steam methane reformer reactor to use as a coarse control to maintain the proper ratio of hydrogen-to-carbon monoxide for methanol synthesis while keeping the flow of biomass particles or chips steady through the bio reforming reactor.

A ratio controller with sensors located at the input of the high temperature Fischer-Tropsch train will control the hydrogen to carbon monoxide ratio of syngas going into the Fischer-Tropsch train. The Ribblett ratio will be about 0.9 to 1.1 controlled by the controller and measured by hydrogen and carbon monoxide sensors at that input. Sensors can also be located at the output of the bio reforming reactor as well as the steam methane reforming reactor to have a ratio control system to know what the molarity of the syngas being supplied by each of these reactors is in order to know the proper volumes to mix to get the end result of having a combined syngas from the steam methane reforming reactor and the bio reforming reactor between the range of 1.5:1 and 2.0:1. The ratio control system will also send feedback to both the bio reforming reactor and the steam methane reforming reactor in order to control the volume of syngas being produced by both of those reactors.

Next, the various algorithms and processes for the control system may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below. In general, the program modules may be implemented as software instructions, Logic blocks of electronic hardware, and a combination of both. The software portion may be stored on a machine-readable medium and written in any number of programming languages such as Java, C++, C, etc. The machine-readable medium may be a hard drive, external drive, DRAM, Tape Drives, memory sticks, etc. However, non-transitory mediums such as carrier waves are not considered a machine-readable medium. Therefore, the algorithms and controls systems may be fabricated exclusively of hardware logic, hardware logic interacting with software, or solely software.

While some specific embodiments of the design have been shown the design is not to be limited to these embodiments. For example, the recuperated waste heat from various plant processes can be used to pre-heat combustion air, or can be used for other similar heating means. Regenerative gas burners or conventional burners can be used as a heat source for the furnace. The Steam Methane Reforming may be/include a SHR (steam hydrocarbon reformer) that cracks short-chained hydrocarbons (<C20) including hydrocarbons (alkanes, alkenes, alkynes, aromatics, furans, phenols, carboxylic acids, ketones, aldehydes, ethers, etc., as well as oxygenates into syngas components. The bio reforming reactor in the stages may add additive or apply an additional process to perform trace contaminant clean-up on the bio syngas prior to sending that bio syngas to the cooling stage. The design is to be understood as not limited by the specific embodiments described herein, but only by scope of the appended claims.

The invention claimed is:

1. An integrated plant to generate chemical grade syngas from a bio reforming reactor for use with either a high temperature or low temperature Fischer-Tropsch synthesis process to produce fuel from biomass, comprising:

an interconnected set of two or more stages forming the bio reforming reactor, wherein a first stage structurally includes a circulating fluidized bed reactor that circulates a heat absorbing media,
wherein the first stage structurally also includes one or more steam inputs and one or more biomass feedstock supply lines into the circulating fluidized bed reactor of the first stage,
wherein the first stage is structured and configured so that the circulating fluidized bed reactor causes a chemical devolatilization of a biomass feedstock from the biomass feedstock supply lines into its constituent gases of carbon monoxide (CO), hydrogen (H2), carbon dioxide (CO2), methane (CH4), tars, chars and other components into a raw syngas mixture,
wherein a second stage has a feed input to receive the raw syngas mixture generated in the first stage,
wherein the second stage also has a reactor structured and configured to perform further reforming of the raw syngas from the first stage into the chemical grade syngas by further applying heat and pressure to chemically crack at least the tars, reform the CH4, or a combination of both, into their corresponding syngas molecules,
wherein the second stage has an exit port that feeds the chemical grade syngas derived from the biomass feedstock to a downstream high temperature or low temperature Fischer-Tropsch train for the Fischer-Tropsch synthesis process to produce the fuel from the biomass,
an external recycle loop connected to the Fischer-Tropsch train,
wherein the high temperature or low temperature Fischer-Tropsch train has an exit tail gas section in which a H2 separator, which is selected from any of
i) a pressure swing absorber separator,
ii) a temperature swing absorber separator,
iii) a hydrogen separation membrane, or
iv) a combination of the three, is used to molecularly separate H2 from the tail gas in order to recycle the recovered H2 to the Fischer-Tropsch train, and
wherein a splitter external recycle loop is configured to route a remainder of the tail gas from the Fischer-Tropsch train, depleted of H2 from the H2 separator, and
i) split the remainder of the tail gas as a fuel gas for
1) a combustor in the first stage of the bio reforming reactor,
2) furnaces for plant components including boilers to make steam,
3) gas fired heaters for the second stage of the bio reforming reactor, and
4) any of these three, as well as
ii) split the remainder of the tail gas as part of a chemical feedstock for the second stage of the bio reforming reactor.

2. The integrated plant of claim 1, further comprising:
a biomass feed system that has one or more supply lines coupled to a fuel gas generator to generate a clean source of methane-rich fuel gas for a heater for a Steam Methane Reformer and a heater for the bio reforming reactor,
wherein the Steam Methane Reformer reactor is connected in parallel to and is configured to cooperate with the bio reforming reactor to produce a syngas mixture for Fischer-Tropsch synthesis,
wherein the biomass feed system has the one or more biomass feedstock supply lines into the circulating fluidized bed reactor of the first stage and the one or more supply lines coupled to the fuel gas generator,
wherein some of the biomass feedstock is supplied for the bio reforming reactor and some biomass feedstock is supplied to the fuel gas generator to create the methane-rich fuel gas for the Steam Methane Reformer and a heater for the bio reforming reactor.

3. The integrated plant of claim 1, further comprising:
a steam methane reformer reactor is configured to cooperate with the bio reforming reactor to produce a syngas mixture for Fischer-Tropsch synthesis,
wherein the Fischer-Tropsch train couples to a refining stage that includes one or more distillation columns,
wherein the high temperature or low temperature Fischer-Tropsch train has an exit tail gas section as well as a Fischer-Tropsch product stream sent to the refining stage to separate and upgrade chemical components in the Fischer-Tropsch product stream in order to send the chemical components of the Fischer-Tropsch product stream to two or more product liquid fuel stages including a gasoline liquid fuel stage, a diesel fuel liquid fuel stage, a jet fuel stage, a natural gas liquids (NGL) stage, and a fuel gas stage,
wherein the integrated plant further includes one or more recycle loops that are configured to recycle some of the product liquid fuels including the natural gas liquids and oxygenates back to an input port of the steam methane reformer as chemical feedstock for the steam methane reformer to enhance a yield of selected fuel products from any of the group of 1) gasoline, 2) jet fuel, and 3) diesel fuel coming out of the product liquid fuel stages, and
wherein the one or more recycle loops also are configured to recycle the fuel gas back into the integrated plant to supply fuel for any of
i) the combustor in the first stage of the bio reforming reactor,
ii) a heater for a steam boiler
iii) the gas fired heaters for the second stage of the bio reformer reactor, or
iv) the furnaces used in another portion of the integrated plant; and thus, the integrated plant ends up merely producing the selected fuel products of the gasoline, the diesel fuel, the jet fuel, or some combination of these three combination thereof, which are all derived in part from the biomass feed in the first stage of the bio reforming reactor.

4. The integrated plant of claim 1,
wherein one or more distillation columns separate the Fischer-Tropsch product streams and an upgrading stage applies one or more processes to one or more of the Fischer-Tropsch product streams in order to remove oxygenates from reaction product components, saturate olefins in the reaction product components, and ensure a minimum cetane rating for a commercial diesel fuel product,
wherein the upgrade stage is also configured to apply one or more treatments to adjust a molecular weight of the diesel fuel product to achieve a desired boiling point range of the diesel product.

5. The integrated plant of claim 1,
wherein the H2 separator is the pressure swing absorber separator and the H2 is recovered back into a syngas compression stage to be co-fed with the chemical grade syngas from the second stage of the bio reforming reactor into the input of the high temperature Fischer-Tropsch train to enhance a yield of selected fuel products, which include any of gasoline, jet fuel, and diesel fuel, coming out of a refining stage, as well as route the remainder of the tail gas composition, depleted in H2, from the exit of the Fischer-Tropsch train, to be the fuel gas feedstock input into the combustor in the first stage of the bio reforming reactor in order to reduce any non-renewable CO2 emissions from the integrated plant by replacing some of any natural gas used for fuel for the combustor with this fuel gas, which is derived originally from the biomass fed into the first stage of the bio reforming reactor.

6. The integrated plant of claim 1,
wherein a CO2 removal stage, is connected in line with the H2 separator in the external recycle loop connected to the Fischer-Tropsch train,
wherein the CO2 removal stage has CO2 absorber columns with material, including but not limited to sodium hydroxide, potassium hydroxide, amine, lithium hydroxide, or activated carbon, in order to deplete an amount of CO2 in the recycled tail gas to be lower than a fixed amount of less than one percent by volume of CO2.

7. The integrated plant of claim 1, further comprising:
a steam methane reformer configured to produce hydrogen-based reaction products from an exit port of the steam methane reformer, which are connected to combine the hydrogen-based reaction products with the chemical grade syngas from the bio reforming reactor to be supplied to an input of the downstream Fischer-Tropsch train,
wherein the steam methane reformer provides hydrogen to correct a composition of a hydrogen to carbon monoxide ratio of the combined syngas supplied to the input of the downstream Fischer-Tropsch train so that the combined stream is at a suitable H2 to CO ratio for chemical synthesis for the Fischer-Tropsch train,
wherein an external recycle loop is connected downstream to the Fischer-Tropsch train,
wherein the high temperature or low temperature Fischer-Tropsch train cooperate with the H2 separator in order for the external recycle loop to recycle the H2 recovered back into a syngas compression stage to be co-fed with the chemical grade syngas from the second stage of the bio reforming reactor into the input of the high temperature or low temperature Fischer-Tropsch train, and then the external recycle loop routes a remainder of the tail gas minus the recovered H2 to be fed to an input of a steam methane reformer to reduce a required capacity of the steam methane reformer by
1) reducing a volume of hydrogen flow through the steam methane reformer; and
2) increasing the steam methane reformer performance by shifting a methane reforming equilibrium towards higher methane and steam conversion.

8. The integrated plant of claim 1, further comprising:
one or more external recycle loops connected to an exit of the high temperature or low temperature Fischer-Tropsch train,
wherein the connected external recycle loop recycles by-products from the Fischer-Tropsch process including H2 in the tail gas of the Fischer-Tropsch train back to the second stage portion of the bio reforming reactor as a chemical feedstock input for the second stage portion of the stage of the bio reforming reactor.

9. The integrated plant of claim 1,
wherein the Fischer-Tropsch train is a low temperature Fischer-Tropsch train that has an operating temperature of less than or equal to 230 degrees C., and is configured to combine with a low temp Fischer-Tropsch upgrading and refiner stage to produce a greater amount of diesel fuel product than gasoline product,
wherein the low temperature Fischer-Tropsch train uses a cobalt based catalyst for the Fischer-Tropsch synthesis,
wherein the Fischer-Tropsch train also connects to an alcohol recovery stage to remove soluble alcohols including methanol, propanol, and ethanol from the water stream produced in the Fischer-Tropsch synthesization process,
wherein the alcohol recovery stage is configured to use one or more distillation columns to recover the alcohols and supply those alcohols into the produced diesel fuel product and gasoline product coming out the Fischer-Tropsch upgrading and refiner stage,
wherein the gasoline product and the diesel product coming out the Fischer-Tropsch upgrading and refiner stage can include up to ten percent alcohol.

10. The integrated plant of claim 1,
wherein the Fischer-Tropsch train is a low temperature Fischer-Tropsch train that has an operating temperature of less than 230 degrees C., and is configured to be combined with a refining stage to separate and upgrade components in a product stream of the Fischer-Tropsch train in order to send the components to two or more product liquid fuel stages including a gasoline stage, a diesel fuel stage, a natural gas liquids (NGL) stage, and a fuel gas stage,
wherein one or more external recycle loops connect to the liquid fuel stages in order to recycle the product liquid fuels including at least the natural gas liquids (NGL) and oxygenates back to a steam-methane reformer as chemical feedstock for the steam-methane reformer in order to enhance a yield of selected fuel products of the gasoline and the diesel fuel coming out of the product liquid fuel stages,
wherein the steam methane reformer reactor is configured to cooperate with the bio reforming reactor to produce a syngas mixture at a proper H2 to CO ratio for Fischer-Tropsch synthesis in the low temperature Fischer-Tropsch train.

11. The integrated plant of claim 1,
wherein the Fischer-Tropsch train is a high temperature Fischer-Tropsch train that has an operating temperature of greater than or equal to 232 degrees C., and is configured to combine with a Fischer-Tropsch upgrading and refiner stage to produce a greater amount of gasoline product than diesel fuel product,
wherein the high temperature Fischer-Tropsch train has an exit tail gas with a connected recycle loop to recycle by-products including H2 in the tail gas of the high temperature Fischer-Tropsch train back via the pressure swing absorber separator as H2 feedstock into the high temperature Fischer-Tropsch train,
wherein the recycle loop also routes a rest of the tail gas as a fuel gas for any of
1) the combustor in the first stage of the bio reforming reactor, 2) furnaces for plant components including boilers to make steam, and 3) gas fired heaters for the second stage of the bio reforming reactor, wherein the second stage of the bio reforming reactor is a catalytic bio reformer that uses a nickel based catalyst or a Platinum-Group Metal (PGM) based catalyst to crack tars at 1700 degrees F. or less in the raw syngas from the first stage to make the chemical grade syngas derived from a steam biomass reforming in this bio reforming reactor.

12. The integrated plant of claim 1, wherein the second stage of the bio reforming reactor is a gas-fired externally heated thermal cracking reactor with one or more steam supply lines and one or more feed lines from the first stage, wherein the second stage is configured to perform steam reforming on the CH4, tars, chars and other components in the raw syngas mixture received from the first stage of the bio reforming reactor, wherein the second stage performs steam reforming these bio-tars and bio-methane/light hydrocarbons into their corresponding syngas molecules, wherein the second stage is also fed natural gas as a feed stock into this second stage in a rough proportion required to get the H2 to CO ratio correct for Fischer-Tropsch synthesis with more H2 content than the minimum H2 to CO ratio needed to produce the H2 the integrated plant needs for an upgrading section that connects to the Fischer-Tropsch train, wherein one or more recycle loops with CO2 removal units is configured to pull out CO2 from this stream and the Fischer-Tropsch tail gas section in order to supply CO2 for lock hoppers in the biomass feed system.

13. The integrated plant of claim 1, further comprising:

a Steam Methane Reformer (SMR) reactor connected in parallel to and configured to cooperate with the bio reforming reactor to produce a syngas mixture for Fischer-Tropsch synthesis, wherein the chemical grade syngas of the bio reforming reactor and chemical reaction products of the Steam Methane Reformer are combined to achieve a proper H2 to Carbon Monoxide (CO) ratio between 1.5 to 2.4 for the Fischer-Tropsch synthesis, with either a cobalt (Co) catalyst or an iron (Fe) catalyst, and does not include a water gas shift stage to adjust the H2 to CO ratio, wherein two or more control systems monitor a chemical composition feedback signal of a first stream of chemical grade syngas from the bio reforming reactor and a second stream of chemical reaction products from the Steam Methane Reformer with two or more sensors to produce the proper amount of H2 to CO ratio for the Fischer-Tropsch synthesis.

14. A method to generate chemical grade syngas from a steam biomass reforming in a bio reforming reactor for use with either a high temperature or low temperature Fischer-Tropsch synthesis process to produce fuel from biomass, comprising:

connecting a set of two or more stages forming the bio reforming reactor, wherein a first stage structurally includes a circulating fluidized bed reactor that circulates a heat absorbing media, wherein the first stage structurally also includes one or more steam inputs and one or more biomass feedstock supply lines into the circulating fluidized bed reactor of the first stage, wherein the first stage is structured and configured so that the circulating fluidized bed reactor causes a chemical devolatilization of a biomass feedstock from the biomass feedstock supply lines into the biomass feedstock's constituent gases of carbon monoxide (CO), hydrogen (H2), carbon dioxide (CO2), methane (CH4), tars, chars and other components into a raw syngas mixture, wherein the second stage has a feed input to receive the raw syngas mixture generated in the first stage, wherein a second stage also has a reactor structured and configured to perform further reforming of the raw syngas from the first stage into the chemical grade syngas by further applying heat and pressure to chemically crack at least the tars, reform the CH4, or a combination of both, into their corresponding syngas molecules, wherein the second stage has an exit port that feeds the chemical grade syngas derived from the biomass feedstock to a downstream high temperature or low temperature Fischer-Tropsch train for the Fischer-Tropsch synthesis process to produce the fuel from the biomass, and coupling a steam methane reformer that produces hydrogen-based reaction products from an exit port of the steam methane reformer, combining the hydrogen-based reaction products with the chemical grade syngas from the bio reforming reactor to be supplied to an input of the downstream Fischer-Tropsch train, wherein the steam methane reformer provides hydrogen to correct a composition of a hydrogen to carbon monoxide ratio of the combined syngas supplied to the input of the downstream Fischer-Tropsch train so that the combined stream is at a suitable H2 to CO ratio for chemical synthesis for the Fischer-Tropsch train, connecting an external recycle loop downstream to the Fischer-Tropsch train, wherein the high temperature or low temperature Fischer-Tropsch train has an exit tail gas in which a H2 separator, which is selected from any of i) a pressure swing absorber separator, ii) a temperature swing absorber separator, or iii) a hydrogen separation membrane, or iv) a combination of the three, is used to separate H2 from the exit tail gas in order for the external recycle loop to recycle the H2 recovered back into a syngas compression stage to be co-fed with the chemical grade syngas from the second stage of the bio reforming reactor into the input of the high temperature or low temperature Fischer-Tropsch train to reduce a required capacity of the steam methane reformer by 1) reducing a volume of hydrogen flow through the steam methane reformer; and 2) increasing the steam methane reformer performance by shifting a methane reforming equilibrium towards higher methane and steam conversion.

15. The method of claim 14, wherein the Fischer-Tropsch train is a low temperature Fischer-Tropsch train that has an operating temperature of less than or equal to 230 degrees C., and is configured to combine with a low temp Fischer-Tropsch upgrading and refiner stage to produce a greater amount of diesel fuel product than gasoline product, wherein the low temperature Fischer-Tropsch train uses a cobalt based catalyst for the Fischer-Tropsch synthesis, wherein the Fischer-Tropsch train also connects to an alcohol recovery stage to remove soluble alcohols including methanol, propanol, and ethanol from the water stream produced in the Fischer-Tropsch synthesization process, wherein the alcohol recovery stage is configured to use one or more distillation columns to recover the alcohols and supply those alcohols into the produced diesel fuel product and gasoline product coming out the Fischer-Tropsch upgrading and refiner stage, wherein the gasoline product and the diesel product coming out the Fischer-Tropsch upgrading and refiner stage can include up to ten percent alcohol.

16. The method of claim 14, wherein the Fischer-Tropsch train is a low temperature Fischer-Tropsch train that has an operating temperature of less than 230 degrees C., and is configured to be combined with a refining stage to separate and upgrade components in a product stream of the Fischer-Tropsch train in order to send the components to two or more product liquid fuel stages including a gasoline stage, a diesel fuel stage, a natural gas liquid (NGL) stage, and a fuel gas stage, wherein one or more external recycle loops connect to the liquid fuel stages in order to recycle the product liquid fuels including at least the natural gas liquids (NGL) and oxygenates back to a steam-methane reformer as chemical feedstock for the steam-methane reformer in order to enhance a yield of selected fuel products of the gasoline and the diesel fuel coming out of the product liquid fuel stages, wherein the steam methane reformer reactor is configured to cooperate with the bio reforming reactor to produce a syngas mixture at a proper H2 to CO ratio for Fischer-Tropsch synthesis in the low temperature Fischer-Tropsch train.

17. The method of claim 14, further comprising:

connecting a steam methane reformer reactor to cooperate with the bio reforming reactor to produce a syngas mixture for Fischer-Tropsch synthesis, wherein the Fischer-Tropsch train couples to a refining stage that includes one or more distillation columns, wherein the high temperature or low temperature Fischer-Tropsch train has an exit tail gas section as well as a Fischer-Tropsch product stream sent to the refining stage to separate and upgrade chemical components in the Fischer-Tropsch product stream in order to send the chemical components of the Fischer-Tropsch product stream to two or more product liquid fuel stages including a gasoline liquid fuel stage, a diesel fuel liquid fuel stage, a jet fuel stage, a natural gas liquids (NGL) stage, and a fuel gas stage, wherein the integrated plant further includes one or more recycle loops that recycle some of the product liquid fuels including the natural gas liquids and oxygenates back to an input port of the steam-methane reformer as chemical feedstock for the steam-methane reformer to enhance a yield of selected fuel products from any of the group of the gasoline, the jet fuel, and the diesel fuel coming out of the product liquid fuel stages, and wherein the one or more recycle loops also recycle the fuel gas back into the integrated plant to supply fuel for any of
  i) a combustor in the first stage of the bio reforming reactor,
  ii) a heater for a steam boiler
  iii) a gas fired heater for the second stage of the bio reformer reactor, or
  iv) a furnace used in another portion of the integrated plant; and thus, the integrated plant ends up merely producing the selected fuel products of the gasoline, the diesel fuel, the jet fuel, or some combination of these three combination thereof, which are all derived in part from the biomass feed in the first stage of the bio reforming reactor.

18. The method of claim 14, further comprising:

connecting one or more external recycle loops to the Fischer-Tropsch train, wherein a splitter external recycle loop is configured to route a remainder of the tail gas from the Fischer-Tropsch train, depleted of H2 from the H2 separator, and
  i) split the remainder of the tail gas as a fuel gas for
    1) a combustor in the first stage of the bio reforming reactor,
    2) furnaces for plant components including boilers to make steam, and
    3) gas fired heaters for the second stage of the bio reforming reactor as well as
  ii) split the remainder of the tail gas as part of a chemical feedstock for either the second stage of the bio reforming reactor or an input to a steam methane reformer that also supplies reaction products to the Fischer-Tropsch train.

* * * * *